(12) United States Patent
Weinberg et al.

(10) Patent No.: US 7,143,076 B2
(45) Date of Patent: Nov. 28, 2006

(54) METHOD AND APPARATUS FOR TRANSFORMING DATA

(75) Inventors: Paul N. Weinberg, Los Angeles, CA (US); Wenphing Lo, Alhambra, CA (US); Zheng Liu, Los Angeles, CA (US); Ariel Hazi, Los Angeles, CA (US)

(73) Assignee: SAP Aktiengesellschaft, Waldorf (DE)

( * ) Notice: Subject to any disclaimer, the term of this patent is extended or adjusted under 35 U.S.C. 154(b) by 582 days.

(21) Appl. No.: 10/022,056

(22) Filed: Dec. 12, 2001

(65) Prior Publication Data

US 2002/0194196 A1  Dec. 19, 2002

Related U.S. Application Data

(60) Provisional application No. 60/255,560, filed on Dec. 12, 2000.

(51) Int. Cl.
*G06F 7/00* (2006.01)

(52) U.S. Cl. ............ 707/1; 707/102; 707/103; 707/104.1

(58) Field of Classification Search ........ 395/701–709; 707/1–10, 101–102, 104, 200; 709/321, 709/327, 246
See application file for complete search history.

(56) References Cited

U.S. PATENT DOCUMENTS

| 5,745,758 | A | 4/1998 | Shaw et al. |
| 5,867,712 | A | 2/1999 | Shaw et al. |
| 5,999,938 | A * | 12/1999 | Bliss et al. ............... 707/102 |
| 6,141,658 | A | 10/2000 | Mehr et al. |
| 6,389,429 | B1 * | 5/2002 | Kane et al. ............... 707/200 |
| 6,665,677 | B1 * | 12/2003 | Wotring et al. ........... 707/100 |
| 6,711,624 | B1 * | 3/2004 | Narurkar et al. .......... 719/321 |

* cited by examiner

*Primary Examiner*—Sam Rimell
*Assistant Examiner*—Mellissa M. Chojnacki
(74) *Attorney, Agent, or Firm*—Dalina Law Group P.C.

(57) ABSTRACT

Embodiments of the invention comprise a method and apparatus for transforming data. Systems implementing the invention allow for loading the data from one or more source tables into one or more destination tables. The system allows for parsing source data fields, defining new source data fields, combining source fields to create source field combinations, and combining destination fields to create destination field combinations. The system allows for mapping source fields and values to destination fields and values, where either the source fields and values or destination fields and values may be field and value combinations, and allows for transforming field values based on destination field type. The tools provided in a system implementing the invention provide a user the ability to intervene at each step during the data transform task. A user may manually input a hierarchy definition, a specific mapping, define rules for combining data fields, or define rules for converting data values.

79 Claims, 11 Drawing Sheets

310

320

Manufacturer field with its values.

Manufacturer field is [nested] partitioned by Category field Figure 5b
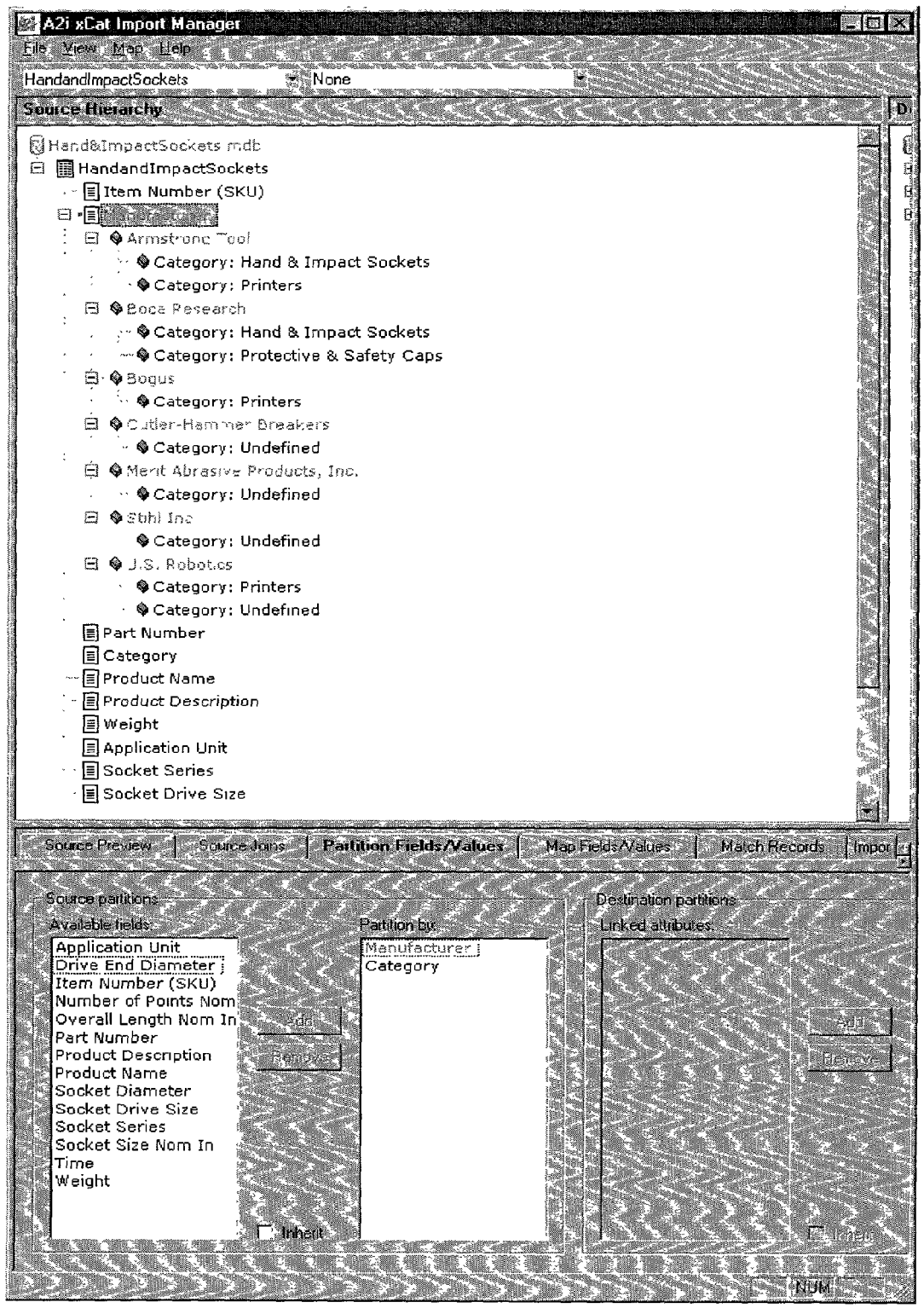

Manufacturer field is [nested] partitioned by Category field,
then [nested] partitioned again by Product Name field.

Manufacturer field is [nested] partitioned by Category field,
then [nested] partitioned again by Product Name field;
then Boca Research value of Manufacturer field is [nested]
partitioned by Socket Series field (breaking its inheritance from Manufacturer field).

Manufacturer field is [nested] partitioned by the [combined] partition of Category and Product Name fields.

Manufacturer field is [combined] partitioned (merged) with the Category and Product Name fields.

Manufacturer field is [combined] partitioned (merged) with the Category and Product Name fields, then the partition of Cutler-Hammer Breakers value is split (breaking its inheritance from Manufacturer field).

METHOD AND APPARATUS FOR TRANSFORMING DATA

This application claims priority on U.S. patent applications, Ser. Nos. 60/255,560 filed Dec. 12, 2000, 09/960,902, and 09/960,541.

BACKGROUND OF THE INVENTION

1. Field of the Invention

The invention relates to the field of computer software. More specifically, the invention relates to a method and apparatus for transforming data.

2. Description of the Related Art

A database is a logical collection of data, in the form of text, numbers, or encoded graphics, organized for storage as a unit, typically in a computer. Databases are commonly organized into tables that are simple, row and column arrangements of related data. The database contains information that characterizes persons, products, companies or anything about which data is collected. In a typical database, the rows of a table represent records, or collections of information about separate items. Each horizontal record contains one or more fields, representing individual data elements. Each vertical column of the table represents one field that is stored for each row in the table. The database records may contain any type of data and that data can be searched, accessed and modified by the user.

A relational database stores information in tables as rows and columns of related data, and allows searches by using data in specified columns of one table to find additional data in another table. In searches, a relational database matches information from a field in one table with information in a corresponding field of another table and combines them to generate a third table that contains the requested data from the two tables. A "lookup" uses one or more pairs of matching fields from two tables, taking the value of the field for a single record in the primary relational database table to "look up" additional information in a single corresponding record in the second lookup table. A "join" combines information from two tables by performing a lookup on every record of the primary table.

As an example of a relational database, if one database table contains the fields CUSTOMER-ID-NO, LAST-NAME, MIDDLE-NAME, FIRST-NAME, STREET, CITY, STATE, ZIP-CODE, ACCOUNT-DATE, LAST-BILL and LAST-PAYMENT and another table contains the fields CUSTOMER-ID-NO, STORE, DEPARTMENT, PURCHASE and PRICE, a relational database can match the CUSTOMER-ID-NO fields in the two database tables to find such information as the customer bill and the names of all customers purchasing a certain amount and what they purchased. Thus, a relational database matches values in two tables to relate information in one table to information in the other table. Computer databases are typically relational databases.

It is often desirable to transform data into a new or existing database from other databases. There is a need to be able to transform data efficiently in large amounts without requiring people to retype or reenter the data manually. To accomplish efficient data transformation, data from each field of the database containing information to be transformed is directed to the appropriate field of the receiving database. Great care is required in the transformation of data from one database to another as the data is easily misdirected to the wrong place in the receiving database, causing errors and confusion. In addition to placing the wrong values in fields, a poorly constructed transformation scheme can overwrite the existing good data in the receiving database.

In the prior art, most data transforms are performed one record at a time. First, each field in the source table, from which data will be transformed, is mapped to a corresponding field in a destination table, which will receive the data, and then each record is transformed. In order to do this properly, the source data will have the same overall table and field structure as the destination data. In particular, the source fields that are to be transformed are typically from the same table and all the data values represented by the source data are typically stored in individual fields rather than embedded within one or more text fields. Further, there is a direct, one-to-one correspondence between individual source fields and individual destination fields; ideally, the corresponding fields would have the same names. In addition, the data types of the source and destination fields are compatible. For mappings to destination fields with value domains, which are enumerated sets of valid values for a destination text field, there is a direct, one-to-one correspondence between the values within the mapped source and destination field values, and the corresponding values are the same.

If the conditions discussed above exist, data transformation can proceed automatically without user intervention. The field mappings and the value mappings can both be completed automatically because of the mapping relationship between corresponding source and destination fields and between matching source and destination values. Unfortunately, these conditions rarely exist, leading to some or all of the following database transformation problems:

(1) The source fields to be transformed may not all belong to a single source table, so that the transform tool can provide a mechanism to first join the tables together. Then, the transform tool provides a mechanism to lookup fields from each source table corresponding to fields in the primary source table in order to create virtual extended records for transform.

(2) One or more source data values may be embedded within longer descriptive text fields. These embedded values cannot be conveniently mapped to destination fields and data values without first being parsed, or separated, from of the source field.

(3) Corresponding source and destination fields may not have the same name, requiring manual field mapping before proceeding with data transformation.

(4) For mappings to destination fields with value domains, the corresponding source and destination field values may not be the same, and destination values may not exist. During a record-at-a-time transformation, a transform tool identifies and flags each discrepancy for exception handling, and the user either manually identifies the corresponding destination value or indicates that a new destination value should be created to correspond to the source value. Even when value mapping is not necessary, source data values might require manual adjustment or correction. Also, it may not be possible to map values directly because the appropriate mapping might be between combinations of two or more source values and combinations of two or more destination values, rather than between individual source and destination values.

(5) For mappings to destination fields without value domains, where value domains are an enumerated set of valid values for a destination text field, the data types of the corresponding source and destination fields may be different, requiring data conversion to the proper data type.

(6) For mapping to destination fields that represent physical measurements, the units of measure in the source data may be: (1) missing entirely, such as when all the values in a source field have the same implicit unit; (2) inconsistent, such as when different text strings are used to represent the same physical unit (e.g., inches, inch, in, or '"'); or (3) different for each source value. In each case, the unit of measure strings must be normalized and appended to each numeric source value as part of the import process.

(7) The hierarchy of the source data might have been flattened into multiple fields in the source table. This flattening can occur when a category hierarchy is stored as three distinct fields in each source record, the first two indicating internal nodes and the third indicating the branch or leaf node in the category hierarchy.

(8) Values from two or more fields in each source record may require merger into a single value for transformation. This can occur when a numeric value and an associated unit of measure are stored in two distinct fields in each source record but are stored in a single unit of measure field in each destination record.

(9) A direct, one-to-one mapping may not exist between the values within individual source and destination fields. Instead, there may be mapping between values or value combinations in one or more source fields and values or value combinations in one or more destination fields. In this situation, a direct, one-to-one mapping does not exist between the values within individual source and destination fields because a direct, one-to-one mapping does not exist between the source and destination fields themselves.

(10) For mappings to a unique field, or field combination, that uniquely identifies each destination record, the transform tool matches the existing destination records that correspond to each source record based on the value of the unique field. During a record-at-a-time transform, the transform tool flags each source record that corresponds to an existing destination record for manual exception handling, and the user indicates that the transform record will typically either: (a) be skipped, (b) replace the existing record or (c) update the existing record. Moreover, there may be more than one unique field in the destination records, and matches between one, but not all, unique fields are also resolved.

Most prior art transformation tools perform record-at-a-time transform and field mapping without value mapping, merging and record matching. Current transformation tools are inadequate to handle the more complex situations described above.

What is needed is a tool for databases that facilitates the transformation of data from other databases. Once the connections between the database table receiving data and the database table providing data are established, the tool facilitates the transformation of data with minimal user review. It is essential that the data transformation proceed with all of the incoming data being placed in the proper fields of the receiving database automatically. The transform tool that is needed will provide for "parametric transform", by providing first for mapping fields, and then for converting and mapping data values, including field-at-a-time handling of source data and comprehensive mapping that is performed at both the field level and the field value level. The parametric transform tool will also have the ability to parse fields and convert, partition, merge and transform source and destination field values, and record matching simultaneously against multiple fields and field combinations.

SUMMARY OF THE INVENTION

Systems implementing the invention provide users with a set of tools for transforming data from databases. When transforming data from a data source into a destination, the challenge resides in converting data attributes or values, and properly placing the data into the destination locations, while keeping data integrity.

Several challenges face a user while transforming data. Among the challenges are data mapping. The data to be transformed may reside in one more tables, the layout of which may differ from the data source to the receiving database. The user may also have to solve a problem that arises when all source data values represented by the source data do not exist in distinct source data fields. In this case the user may have to parse one or more source data values embedded within text description fields to extract the data. The source tables and the destination tables, even having the same names, may not have a direct, one-to-one correspondence between source and destination fields. In this case, it is not possible to map individual source and destination fields directly when the mapping relationship exists between the combination of two or more source fields and/or the combination of two or more destination fields and/or attributes; fields are be combined for mapping of field combinations rather than individual fields.

Embodiments implementing the invention provide solutions that facilitate transforming data from one or more data sources into one or more data destinations. The method can also be used by a computer programer to enhance data exchange computer software. The tools built using the invention allow users transforming the data to manipulate the data during the transform process using one or more of the following steps. The steps comprise joining two or more tables from a source database, parsing data fields, mapping data fields from source tables into destination tables, defining new (or temporary) data fields, partitioning tables into sets according to data field values, merging data fields, transforming and matching both fields and field values.

A system implementing the invention starts by creating a virtual extended record consisting of fields from the primary source table, extended with lookup fields from lookup source tables that have been joined to the primary source table. Corresponding source and destination fields are mapped, automatically or with manual intervention if necessary. Prior to transforming the data, the system allows for mapping where the source data first can be pre-processed a field at a time. For each field, the system lists the complete set of distinct values for that field, viewing the data a field at a time, instead of viewing data values a record-at-a-time, during the transform.

The system allows for handling mapping and transform exception handling. The mapping and exception-handling are carried out by parsing a source field with descriptive text containing one or more embedded data values, and extracting the component data values and placing the data values into transition fields. The system allows for converting the data type and/or a unit of measure of the source fields based on the mapped destination field.

The system allows for partitioning the source and/or destination field or values to create value combinations. The partitioning mechanism can be used to achieve several very different objectives: (a) create or reconstitute hierarchy in the source data; (b) merge values stored in two or more distinct source fields into a single value for each record; and (c) combine fields to establish a direct, one-to-one mapping between source and destination value combinations that might not otherwise exist between the values within individual source and destination fields.

After partitioning, value mapping can then be performed to establish the direct, one-to-one mapping between corresponding source and destination values or value combinations for each real or phantom source field or field combination. Additionally, for mappings to a unique field (or field combination) that uniquely identifies each destination record, the system allows users to specify whether the transformed source record should be skipped, whether a new record should be created if an existing destination record has not been found, or whether an existing destination record should be replaced or updated with the transformed source record to match a record to existing records.

Systems implementing the invention provide transform tools for mapping fields, and for converting and mapping data values, including field-at-a-time handling of source data, comprehensive mapping that is performed at both the field level and the field value level, the ability to parse fields and convert, partition, merge, and transform source and destination field values, and record matching simultaneously against multiple fields and/or field combinations.

DETAILED DESCRIPTION OF THE INVENTION

The invention is a method and apparatus for transforming data between data sources (e.g., a first database) and one or more data destinations (e.g., a second database). In the following description, numerous specific details are set forth to provide a more thorough description of embodiments of the invention. It will be apparent, however, to one skilled in the art, that the invention may be practiced without these specific details. In other instances, well known features have not been described in detail so as not to obscure the invention.

The disclosure uses several terms and phrases to describe one or more technical aspects of the invention. Some terms and phrases are explained as they are being used. Other terms and phrases are commonly used in the art. Appendix A presents definitions of terms and phrases commonly used in the art that have been adopted in the current disclosure.

Embodiments of the invention describe a method that facilitates transforming (e.g., importing, converting, relocating) data from one or more data sources into one or more data destinations. The method can be used by a computer programmer to enhance computer software for data exchange. End users may also want applications implementing the invention to transform data from one or more data sources into one or more data destinations. In the following, data sources refers to any location capable of storing data either temporarily (e.g., in a computer memory) or permanently (e.g., on a magnetic storage medium, such as a disk drive, magnetic tape, laser disk, etc.). The system contemplated by embodiments of the invention can transform any type of data and the term data structure refers to any data or database that is utilized by the system. In one embodiment of the invention each data structure contains a set of records, fields, and values, but in other instances the data structure represents any type of raw data or structed data (e.g., XML).

Systems implementing embodiments of the invention may use one or more of the data handling steps described below. The data handling steps comprise fetching data fields from one or more database tables, joining two or more databases tables, parsing data fields, mapping two or more data fields to each other or to newly defined data fields, partitioning tables into sets according to data fields, merging data fields, and transforming and matching both fields and field values.

Figure 1:
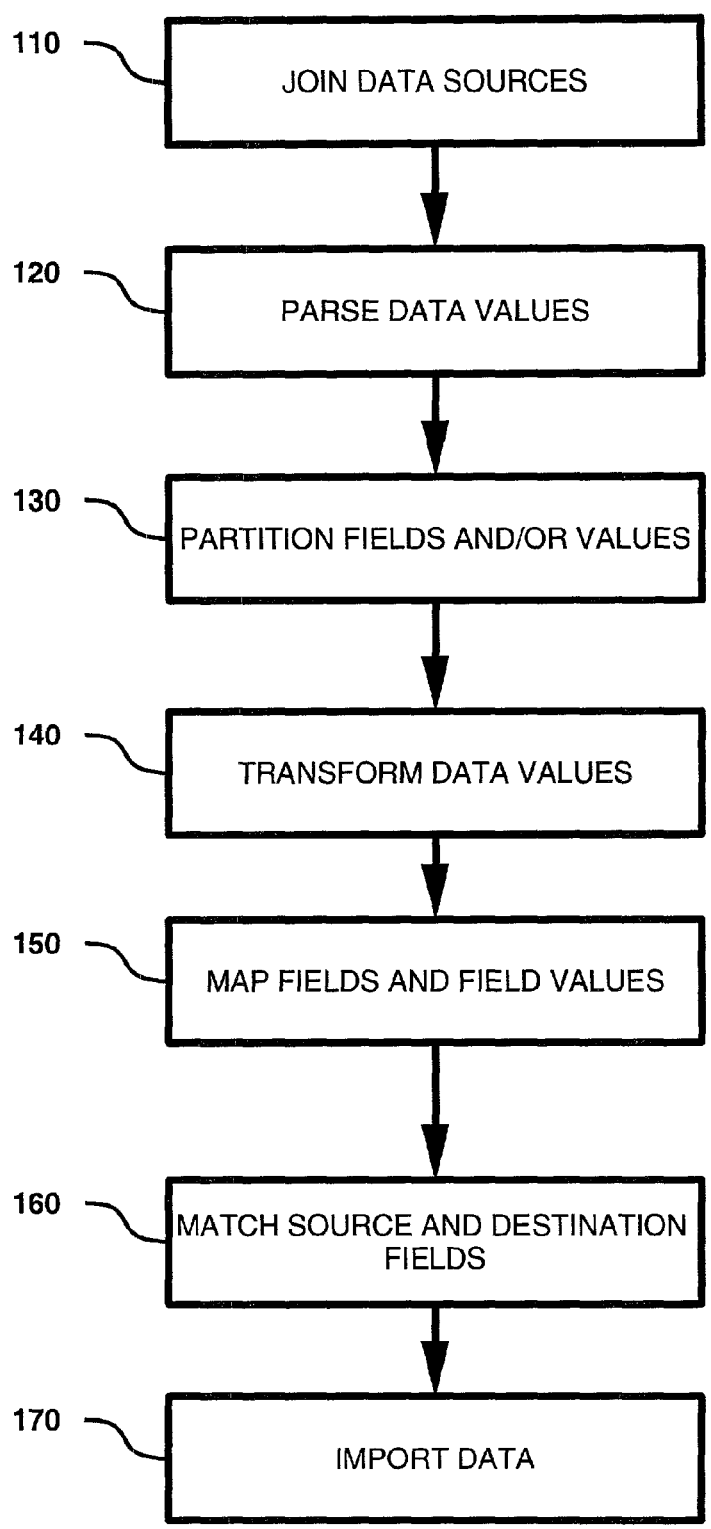
FIG. 1 is flowchart illustrating the steps involved in transforming data in an embodiment of the invention.

FIG. 1 is a flowchart illustrating the steps involved in transforming data in an embodiment of the invention. At step 110, a system implementing the invention joins two or more data sources from which data is to be transformed. The system stores the data into a table referred to as the source table. The system creates a virtual extended record that consists of fields from the primary source table, extended with lookup fields from lookup source tables that have been joined to the primary source table. At step 120, the system parses data fields from the source tables. Parsing field values allows, in later steps, for populating new data fields with values from a category of data values. Newly created data fields can be joined to the source table, or to a lookup table. At step 130, systems implementing the invention create partitions of data fields, based on their values and types. Embodiments of the invention determine, based on field values, whether fields possess a one-to-one relationship between individual source and destination fields or a one-to-many relationship between combinations of source and destination data fields. At step 140, embodiments of the invention transform the data according to certain criteria. For example, data transformation may comprise conversion of measurement units or currency conversion. At step 150, embodiments of the invention create mapping between source data fields and destination data fields. Embodiments of the invention, automatically map the corresponding source and destination fields.

Other embodiments of the invention allow users to intervene manually to alter the fields' mapping structure. A system implementing the invention collapses the set of values for a field across the entire source record set into the set of distinct values, and then offers a comprehensive value-mapping step, where the source data can be pre-processed first, one field at a time. Since the number of distinct values for each field is usually dramatically smaller than the total number of records to be transformed, the maximum number of exceptions is the sum, rather than the product, of the number of distinct values in each mapped field and mapping and exception-handling, therefore, are both more efficient. For a source field mapped to a destination field that has a value domain, partitions can be applied to the source and/or destination fields, or individual values, to create value combinations. The partitioning mechanism can be used to achieve several very different objectives. For example, embodiments of the invention allow for creating and/or reconstituting a hierarchy in the source data, merging values stored in two or more distinct source fields into a single value for each record and/or establishing a direct, one-to-one mapping between source and destination value combinations that might not otherwise exist between the values within individual source and destination fields.

After partitioning, embodiments of the invention perform value mapping to establish the one-to-one mapping between corresponding source and destination values or value combinations for each real or phantom source field or field combination. Finally, for mappings to a unique field (or field combination) that uniquely identifies each destination record, record matching to existing records can be performed with the ability to specify whether the transformed source record should be skipped, whether a new record should be created if an existing destination record has not been found, or whether an existing destination record should be replaced or updated with the transformed source record.

At step 160, embodiments of the invention match unique fields or field combinations (called "compound keys") to identify one or more destination records that correspond to each field of a source record to be transformed. Embodiments of the invention determine whether a new record should be created or an existing record should be replaced or updated. At step 170, embodiments of the invention execute the data transformation. The process of transforming data proceeds automatically using the mapping and record matching procedures executed by previous steps.

Figure 2:
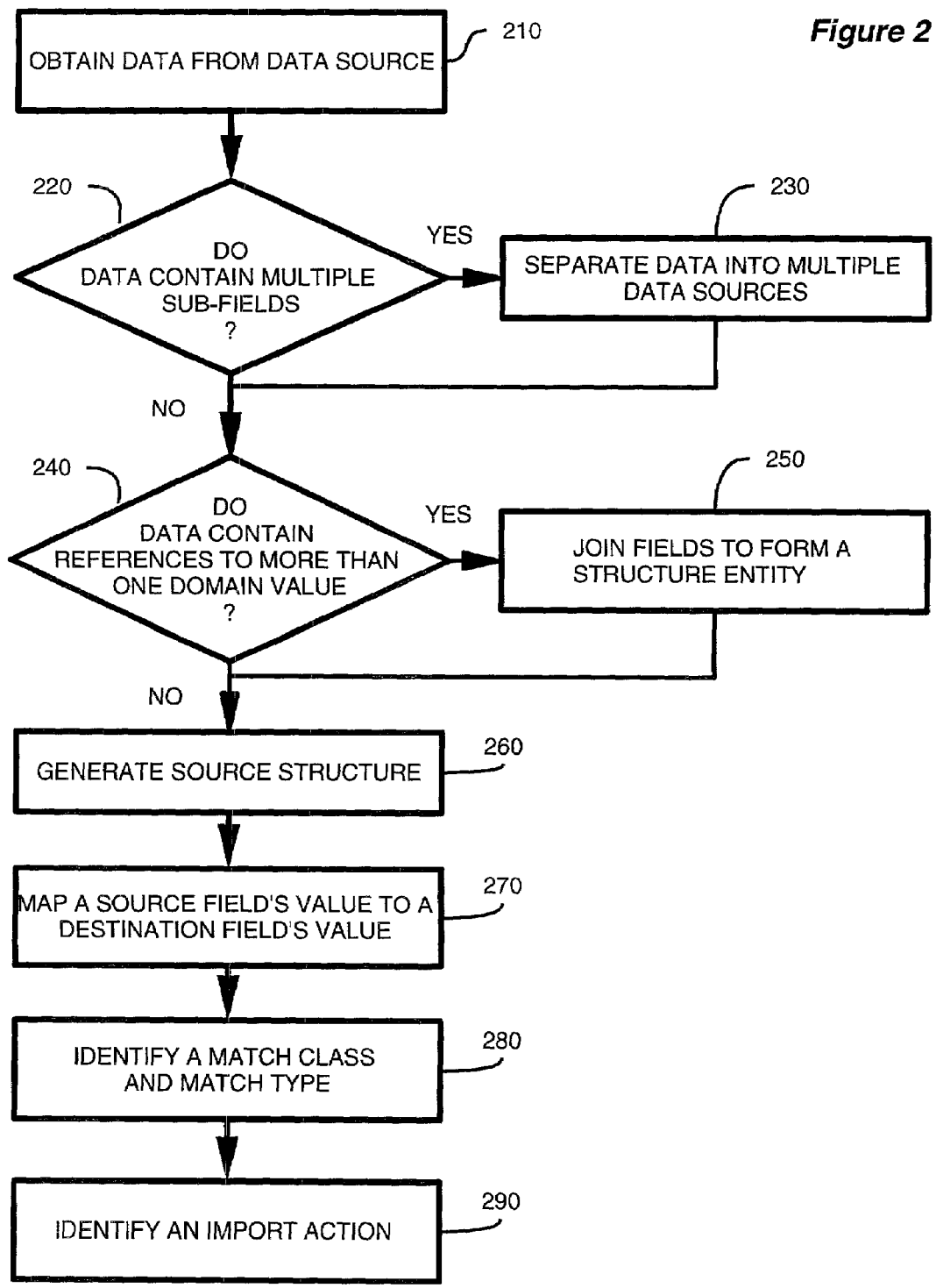
FIG. 2 shows a flowchart further illustrating the detailed steps for transforming data from a data source in accordance with an embodiment of the invention.

FIG. 2 shows a flowchart further illustrating the detailed steps for transforming data from a data source in accordance with an embodiment of the invention. At step 210, the system loads data from one or more sources of data storage. Examples of data sources are tables in a database, flat files and streams of data through a network connection. In an embodiment of the invention, the primary source table is joined with one or more lookup source tables, so that matching fields in the primary and source tables can be matched, with the data in the field of the primary table used to look up information from matching fields in the source lookup tables, and then combined with the data in the primary table. Joining the primary table to a lookup table can be accomplished in one of several ways.

Embodiments of the invention automatically detect table relationships in the data source and join data tables. In cases where data sources store primary key/foreign key and/or main table/related table relationships and make this information available to an external program through a programmatic interface, the transform tool implementing the invention automatically obtains these relationships through the interface and reflects them in the table and field hierarchy. For example, Microsoft Access stores these relationships and the ADO interface in Microsoft Access makes them available to the transform tool.

Other embodiments of the invention allow a user to intervene manually to add or modify data in the data hierarchy. In cases where data sources do not store the relationships between tables or make them available through a programmatic interface, or create additional relationships that are not explicitly defined in the data source, the transform tool allows the user to add a matching field in the primary table to its counterpart in the lookup table in order to create additional relationships. The effect of a lookup is to create a virtual source table for transform that is defined by the left outer join between the primary source table and each of the lookup tables. It is worthwhile to note that joins are transitive, i.e., if Table A is joined to Table B and Table B is joined to Table C, Table A is effectively joined to Table C. The system detects transitive relationships, and allows a look up, for example, from Table C into Table A. Joins are reflected in the table and field hierarchy, by indicating the matching field pair for each join, and include an additional reference to the lookup table in the list of fields of the primary table. Once the joins have been established, it is then possible to insert each lookup field from the lookup table into the reference to the lookup table in the primary table, adding the field into the list of primary table fields, and, in effect, building the extended virtual record consisting of fields from the primary table and lookup fields from one or more lookup tables. Embodiments of the invention provide users with tools such as graphical representation of fields and field sets, allowing a user to interact with the data tables. For example, inserting a new field into a table and/or moving a field from one table to the other may be carried out by the user by simply using drag-and-drop functionality of the graphical user interface.

Embodiments of the invention provide functionality for creating additional table relationships not defined in the data source and drag-and-dropping lookup fields from lookup tables into the primary source table. In addition, a virtual source table can be created for transform consisting of all the fields of the primary source table and the fields looked up from each of the lookup tables.

Embodiments of the invention parse data values. For example, long text descriptions can be parsed to extract embedded data values and deposit them into one or more phantom fields. Each phantom source field can then be mapped to a corresponding destination field and, if necessary, each of the extracted source values can be mapped to a corresponding destination value. Embodiments of the invention provide functionality for extracting embedded data values, depositing them into phantom fields and using a phantom-field metaphor to extend the field mapping mechanism.

At step 220, embodiments of the invention check whether data fields possess sub-fields. If the data fields are found that are related to sub-fields, the data is separated into multiple data sources at step 230. For example, one or more lookup tables could be created to store a hierarchy of fields and field values. Embodiments of the invention check data fields to ascertain whether they reference one or more field values at step 240. If data contain references to more than one domain value, one or more fields and/or field values are joined and added to one or more lookup tables.

Embodiments of the invention partition source and/or destination fields and/or values into value combinations to create or reconstitute a hierarchy in the source data. Embodiments of the invention merge values stored in two or more distinct source fields into a single value for each record. Other embodiments of the invention establish a direct, one-to-one mapping between source and destination value combinations that might not otherwise exist between values within individual source and destination fields. When a hierarchy in the source data has been flattened into multiple fields in the source table, nested partitions create or recreate this hierarchy prior to transform. For example, when a table of values, for example a numeric value and its associated unit of measure, have been split into two or more source fields, combining partitions merges the values in the multiple fields into a single merged value.

When a direct, one-to-one mapping does not exist between values within mapped individual source fields and individual destination fields, source and/or destination partitions establish a one-to-one mapping ("disambiguate") between: (i) values or value combinations in one or more source fields, and (ii) values or value combinations in one or more destination fields. Embodiments of the invention partition source values, when a value within a single source field corresponds to a combination of values within multiple destination fields, with the result that the source value is partitioned by the corresponding values of one or more additional source fields into multiple value combinations that correspond on a one-to-one basis to value combinations within multiple destination fields. Embodiments of the invention partition destination values, when a value within a single destination field (or attribute) corresponds to a combination of values within multiple source fields, with the result that the destination value is partitioned by the corresponding values of one or more additional destination fields (or attributes) into the multiple value combinations that correspond on a one-to-one basis to values combinations within multiple source fields.

After partitioning, each source value or value combination can be directly mapped to the corresponding destination value or value combination. The different types of partitions are summarized in Table 1 below:

TABLE 2

| Destination Field Type | Mapping | Description |
| --- | --- | --- |
| Lookup text field or text attribute | Yes | Source values are mapped to the value domain of the destination text field. |
| Numeric field or attribute | No | Value-level mapping unnecessary; data conversion and adding unit of measure may be necessary. |
| Non-lookup text field | Maybe | Value-level mapping may or may not be necessary depending on the destination data. |

Regardless of whether or not a field requires value mapping, the source values themselves may need to be adjusted or corrected, may require data type conversion based on the respective source and destination field data types, and may require the assignment of a unit of measure.

TABLE 1

| Partition | By | Description |
| --- | --- | --- |
| Source Partitions | | |
| Field | Field | Partition each of the values of a field by each of the values of a second field. |
| Field Value | Field | Partition a single value of a field by each of the values of a second field. |
| Destination Partitions | | |
| Field | Field | Should not be necessary in a properly structured catalog. |
| Field Value | Field | Should not be necessary in a properly structured catalog. |
| Attribute Field* | Attribute | Partition each of the values of an attribute field by each of the values of an attribute. The partition is applied only to the values of the attribute field to which the attribute is linked. |
| Attribute Field Value | Attribute | Partition a single value of an attribute field by each of the values of a linked attribute. |
| Attribute | Attribute | Within a previous partition of an attribute field value by an attribute, partition each of the values of the attribute by each of the values of a second attribute (where both attributes are linked to the same attribute field value). |
| Attribute Value | Attribute | Within a previous partition of an attribute field value by an attribute, partition a single value of the attribute by each of the values of a second attribute (where both attributes are linked to the same attribute field value). |

*An "Attribute Field" is a taxonomy field such as "Category" that has linked attributes associated with it.

Note that, for efficiency, partitions can be inherited from parent nodes in a hierarchy. The partitions are partial, rather than full, partitions so that the enumeration includes only value combinations that actually exist, substantially reducing the number of value combinations that need to be generated by the system and handled by the user.

At step 260, embodiments of the invention generate the data source structure used in later steps to map and transform data. Embodiments of the invention also apply one or more transformations at the field level and also at the individual data value level. Examples of transformations are mapping tables, substitution tables, case change and lexicons.

At step 270, embodiments of the invention use field and value mapping to establish the correspondence between source and destination fields and values. In this step, each source field is mapped to its corresponding destination field or attribute and, if necessary, each source value for a mapped field is mapped to its corresponding destination value.

Whether or not a field requires value mapping is based exclusively on the destination field or attribute type, and in most cases can be determined automatically by the system as shown in the Table 2 below:

Embodiments of the invention allow a user to merge and sort the contents of two distinct lists of items, where items can be "selected" from either list, and where a selection in each list corresponds to a selection in the other list. The user may map data in either direction and may map values that are clearly identified.

Embodiments of the invention provide user interface functionality allowing a user to select multiple items from a single list by highlighting and selecting each of one or more items. By contrast, "available/selected" multi-item list selection uses two lists: a list of available items and a second list of selected items. For example, as each item is selected, the item is removed from the list of available items and moved to the list of selected items. The problem with available/selected multi-item lists is that they remove selected items from the list of available items, so that neither list is complete once mapping has begun. Also, it would be difficult or impossible to map a single source value to multiple destination values, since a destination value is removed from the pool when it is mapped. Instead, an embodiment of the invention removes mapped values from one list and places them next to the corresponding values in the other list or, alternatively, creates a third list with the pairs of values. Embodiments of the invention provide functionality for making each list a grid and making the mapping function symmetrical so that, for each mapping, each corresponding value is placed into the other grid.

Thus, the entire set of fields and values are presented as two pairs of grids. The two field grids list the set of source fields and destination fields (and attributes), respectively. The two value grids list the complete set of distinct values corresponding to the selected source and destination fields, respectively. If the selected field has been partitioned, the value grid lists value combinations rather than individual values, with or without a hierarchy, depending upon whether the partitions are nested or combined.

Embodiments of the invention allow for creating new values as part of the value mapping process. New values can be added to the set of destination values. The mapping hierarchy is described in Table 3 below:

TABLE 3

| Command | Flat → Flat | Hierarchy → Flat | Flat → Hierarchy | Hierarchy → Hierarchy |
|---|---|---|---|---|
| Map | Map the selected source item to the selected destination item. | Map the selected source leaf node to the selected destination item. | Map the selected source item to the selected destination leaf node. | Map the selected source node to the selected destination node. |
| Add | Add the selected source item(s) after the last destination item. Cannot add an item that already exists. | Add the selected source leaf node(s) after the last destination item. Cannot add an item that already exists. Can add source leaf nodes only; cannot add from an internal node. | | |
| Add as Sibling | | | Add the selected source item(s) as siblings after the selected destination leaf node. Cannot add a node that already exists. | Add the selected source nodes(s) as siblings after the selected destination internal or leaf node. Cannot add a node that already exists. |
| Add as Child | | | Add the selected source item(s) as leaf node children of the selected destination node. Cannot add a node that already exists. Cannot add a child to a leaf node that already has records linked, or to a leaf node that has just been added. | Add the selected source nodes(s) as children of the selected destination node. Cannot add a node that already exists. Cannot add a child to a leaf node that already has records linked, or to a leaf node that has just been added from a source leaf node. |
| Add Branch as Sibling | | | | Add the selected source node and all of its descendents as a sibling after the selected destination internal or leaf node. Cannot add a node that already exists. |
| Add Branch as Child | | | | Add the selected source node and all of its descendents as a child of the selected destination node. Cannot add a node that already exists. Cannot add a child to a leaf node that already has records linked. |
| Merge Branch | | | | Merge the selected source node and all of its descendents with the selected destination node, creating new destination nodes for source nodes that do not exist and are not mapped. |

The value mapping provided by the system offers an entirely new approach to handling exceptions in the source data. It allows the source data to be pre-processed, a field-at-a-time, prior to transform, rather than processed, a record-at-a-time, during transform so that all of the exception handling is dealt with initially and the actual transform can proceed without interruption regardless of the size of the record set. The value mapping also provides a powerful way to map from source hierarchy to destination hierarchy and a rich ability to create destination hierarchy (both internal and leaf nodes) automatically as part of the transform.

At step 280, embodiments of the invention identify a match class and match type between source data fields and destination data fields. Record matching against unique fields or fields combinations ("compound keys") is used to identify the one or more destination records that correspond to each source record to be transformed in order to determine whether a new record should be created or an existing record replaced or updated. In this step, one or more fields, or field combinations, are specified that uniquely identify each destination record and each source record is matched to corresponding destination record(s) based on the value(s) of these field(s).

It is useful to note that value matching at the record level has both similarities and differences from value mapping at the field level. Value mapping is done against the relatively small set of distinct valid values for a mapped field and the mapping assumes that each destination value will most likely exist in multiple records. Value mappings can be defined between source and destination values that may or may not be equal and, when value mapping for a pair of mapped fields is complete, all source values should have been mapped to previously existing or just-created destination values.

By contrast, value matching is done against the relatively large set of valid values for a unique field, probably the number of records in the destination table. The matching assumes that each of the values in each of the matching fields is (or should be) unique across the entire table. Source and destination values are equal and, when value matching is complete, some source records will be matched to existing destination records and some will not.

At step 290, embodiments of the invention identify one or more transform actions once all of the fields have been mapped, all of the values have been mapped for each field that requires value mapping, and the transform actions have been specified for each source and matching destination record. The flow described in the previous steps guarantees that once all the setup has been completed, transform can proceed without interruption. Moreover, all of the mappings and partitioning can be saved to a file for future transforms of updates from the same data source.

Figure 3:
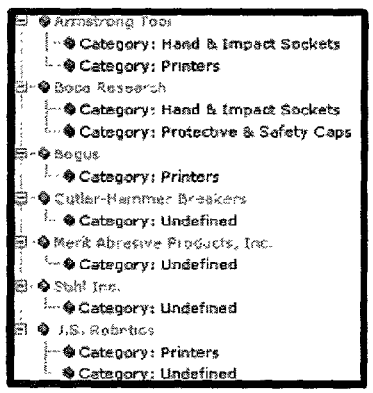
FIG. 3 is a block diagram representing user interface components that contain nested and combined partitions, respectively, in an application implementing the invention.
Figure 3:
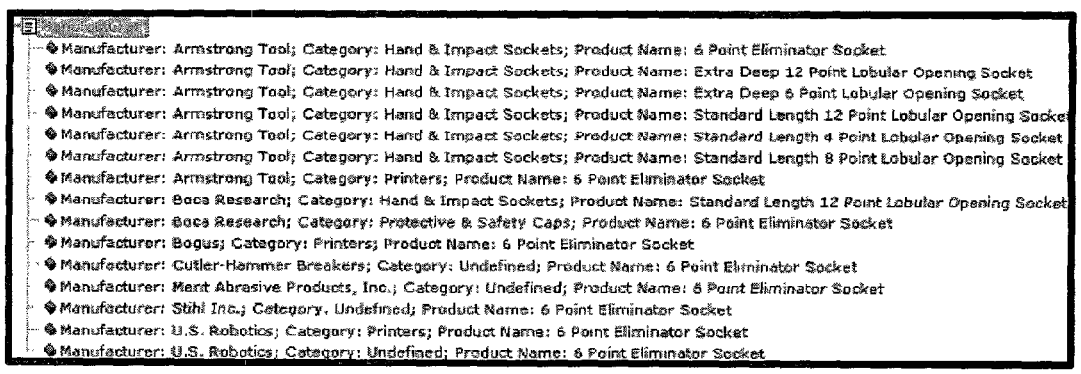

FIG. 3 is a block diagram representing user interface components that contain nested and combined partitions, respectively, in an application implementing the invention. For a particular node in the hierarchy, partitions can be nested (creating a hierarchy among value combinations) or combined (merging value combinations).

Combining partitions is described in a related patent application (Ser. No.: 09/960,902) that is included in its entirety, herewith, by reference. In embodiments of the present invention, combined partitions have been extended to include the ability to combine the first partition of a particular node with the field or value represented by the node itself, which was not previously possible. The result of a partition is a set of value combinations among values in each of the fields participating in the partition and each value combination corresponds to actual records containing that particular combination of values for the fields.

A nested partition (e.g., block 310 of Table 3) displays each value of each value combination as a distinct node in a hierarchy. The values of the first field of the partition are represented as sibling nodes at one level in the hierarchy, the values of the second field of the partition are represented as sibling nodes at a second level in the hierarchy and as children of the first set of sibling nodes. This is repeated for each field participating in the partition, as shown in block 310.

By contrast, a combined partition displays (e.g., block 320) each value combination consisting of the value of each of the fields participating in the partition as a single merged value in a single node in a hierarchy, with the entire set of value combinations represented as sibling nodes at a single level in the hierarchy, as shown in block 320. For example, if the original records contain the following combinations of "City", "State", and "ZIP" code (Zone Identification Postal code) as shown in Table 4:

TABLE 3

Original records:

| City | State | Zip |
|---|---|---|
| Los Angeles | CA | 90046 |
| Los Angeles | CA | 90025 |
| Hollywood | CA | 90069 |
| Hollywood | CA | 90036 |
| Miami Beach | FL | 33139 |
| Hollywood | FL | 33019 |

Then, the nested partition of "State" by "City" would be as shown in Table 4:

TABLE 4

Nested partition:

| State | City |
|---|---|
| CA | Los Angeles |
|  | Hollywood |
| FL | Miami Beach |
|  | Hollywood | and the combined partition of "State" by "City" would be as shown in Table 5:

TABLE 5

Combined partition:

| State; | City |
|---|---|
| CA | Los Angeles |
| CA | Hollywood |
| FL | Miami Beach |
| FL | Hollywood |

Not coincidentally, the value combination, represented by each bottom-level leaf node in a nested partition, corresponds to the value combination represented by each top-level sibling node in a combined partition and also to precisely the same set of original records as shown in Table 6 below:

TABLE 6

| Original records: | | | Nested partition: | | Combined partition: |
|---|---|---|---|---|---|
| City | State | Zip | State | City | State; City |
| Los Angeles | CA | 90046 | CA | Los Angeles | CA Los Angeles |
| Los Angeles | CA | 90025 |  |  |  |
| Hollywood | CA | 90069 |  | Hollywood | CA Hollywood |
| Hollywood | CA | 90036 |  |  |  |
| Miami Beach | FL | 33139 | FL | Miami Beach | FL Miami Beach |
| Hollywood | FL | 33019 |  | Hollywood | FL Hollywood |

Nested and combined partitions would thus appear to be equivalent and interchangeable and, in some ways, they are. However, there are subtle differences between nested and combined partitions, some for visual convenience and others that are essential for fully flexible field and value mapping, as illustrated above, and further described below:

Node values. Even though the bottom-level leaf nodes of a nested partition correspond to the top-level sibling nodes of a combined partition and both correspond to the same value combinations and original records, the node values themselves are very different. In a nested partition, the value of the bottom-level leaf node is the value of the last partition field whereas, in a combined partition, the value of the top-level sibling node is the merged value of all the partition fields.

Hierarchy. A nested partition creates the entire hierarchy represented by the value combinations of the partition, along with all associated internal nodes, while a combined partition flattens the hierarchy and does not create any internal nodes.

Number of nodes for each field value. A nested partition creates a single internal node for each value of the first participating field, with child nodes for each value of the second participating field (and so on for each participating field), whereas a combined partition creates multiple nodes for each value of the first participating field, making it more difficult with a combined partition to further partition a value of the first field.

In particular, when partitioning fields by fields and with value mapping to existing destination values and/or hierarchy, nested and combined partitions achieve the same effect. However, nested and combined partitions can be used to a very different effect when: (a) partitioning individual field values, rather than an entire field; (b) merging field values without value mapping to the mapped destination field; (c) creating new destination values; and (d) creating new destination hierarchy; as follows:

Partition individual field values. In the example above, if the partition of "State" value, California, were to be further partitioned by "ZIP" but the value, Florida, were to remain partitioned only by "City," the nested partition of "State" by "City" would be more appropriate than a combined partition, which would create two nodes containing the "State" value, California, rather than one. In this case, the nested partitions would be as shown in Table 7 below:

TABLE 7

| State | City | Zip |
|---|---|---|
| CA | Los Angeles | 90046 |
|  |  | 90025 |
|  | Hollywood | 90069 |
|  |  | 90036 |
| FL | Miami Beach |  |
|  | Hollywood |  |

Merge field values without value mapping. If the goal is to merge values without value mapping, a combined partition is appropriate since these merged values are used to create the destination field values. By contrast, when merging values with value mapping to existing destination values, it does not matter whether the partition is nested or combined since the value of the destination field already exists and only the value combination represented by the node is relevant, not the value of the node itself.

Create new destination values. If new destination values need to be created, either a nested partition or a combined partition may be appropriate depending upon the circumstances since nested and combined partitions result in different node values and the value of each node can be used to automatically define the new destination field values.

Create new destination hierarchy. If an additional destination hierarchy needs to be created, a nested partition is appropriate since its internal nodes can be used to automatically define the new destination hierarchy.

In mathematical terms, the partitioning mechanism automatically generates the ordered n-dimensional Cartesian product across value domains from n fields to create the entire domain of ordered value combinations. The partitioning mechanism automatically eliminates those value combinations that don't exist in the original record set and then allows additional Cartesian products to be applied to the previous results, to either the entire domain of value combinations or to just a subset of the value combinations. In the examples above, the value domains, Cartesian and sub-Cartesian products, and value combination domains are as shown in Table 8 below:

TABLE 8

[State] value domain

CA
FL

[City] value domain:

Los Angeles
Hollywood
Miami Beach

[State; City] Cartesian product:

|  | City | | |
|---|---|---|---|
| State | Los Angeles | Hollywood | Miami Beach |
| CA | CA | CA | CA |
|  | Los Angeles | Hollywood | Miami Beach |
| FL | FL | FL | FL |
|  | Los Angeles | Hollywood | Miami Beach |

[State; City] value domain:

CA
Los Angeles
CA
Hollywood
FL
Hollywood
FL
Miami Beach

[Zip] value domain:

90046
90025
90069
90036
33139
33019

[State = CA; City; Zip] sub-Cartesian product:

|  | Zip | | | | | |
|---|---|---|---|---|---|---|
| State; City | 90046 | 90025 | 90069 | 90036 | 33139 | 33019 |
| CA Los Angeles | CA Los Angeles 90046 | CA Los Angeles 90025 | CA Los Angeles 90069 | CA Los Angeles 90036 | CA Los Angeles 33139 | CA Los Angeles 33019 |
| CA Hollywood | CA Hollywood 90046 | CA Hollywood 90025 | CA Hollywood 90069 | CA Hollywood 90036 | CA Hollywood 33139 | CA Hollywood 33019 |

[State = CA; City; Zip] value domain:

CA
Los Angeles

TABLE 8-continued

```
90046
CA
Los Angeles
90025
CA
Hollywood
90069
CA
Hollywood
90036
```

Note that each value of a field's value domain corresponds to an underlying subset of records that contain the value, so that there is a correlation between values and value combinations and corresponding subsets of underlying records. In particular, each value domain partitions (in the precise mathematical sense) the entire set of records into a set of non-overlapping subsets such that each record belongs to exactly one subset and the entire set of subsets contains the entire set of records. Each partition of a field by another field further partitions each subset into smaller subsets. Thus, the term, partition, is used to describe the mechanism of creating value combinations because of the precise partitioning effect that it has on the underlying subsets of records.

The partitioning mechanism is necessary when the subsets of source records created by partitioning the entire set of source records by the values of just a single source field do not correspond to the subsets of destination records created by partitioning the entire set of destination records by the values of just the single corresponding destination field. In these cases, the mechanism is used to further partition, or break down, the subsets of source and/or destination records into smaller subsets that do correspond to one another. Thus, the effect of establishing a one-to-one correspondence between source and destination values and/or value combinations is mathematically equivalent to establishing a correspondence between the underlying subsets of source and destination records.

The invention provides several partitioning schemes, each of which has a slightly different effect but each is still just a variant of the same overall partitioning mechanism. This mechanism is based upon the partitioning capabilities described in provisional patent application Ser. No. 60/234, 015, filed on Sep. 20, 2000 (which is incorporated herein by reference), but extends and completely generalizes the capability to be infinitely flexible.

A system implementing the invention may combine nested and combined partitions for application to source fields and/or values and destination fields and attributes and/or values in an unlimited number of ways to achieve arbitrarily complex rationalizations of source and destination data that may have entirely different structures. The examples that follow illustrate some, but certainly not all, of the different cases that may or may not require partitioning. Similarly, each of the partitions in the examples can be combined with any other partition to achieve any desired effect.

Embodiments of the invention allow for automatically generating n-dimensional Cartesian products to create the entire domain of ordered value combinations. The invention allows for eliminating value combinations that do not exist in the original record set from the set of value combinations and for using the partitioning of fields and field values to create value combinations that can be used as a proxy for partitioning the set of underlying records into subsets and subsets of subsets. The invention also allows for layering a drag-and-drop, WYSIWYG (What You See Is What You Get), interface on top of the algebra of Cartesian products and sub-Cartesian products and for providing a mechanism that allows the user to use the WYSIWYG interface to deal with individual values and value combinations rather than with the corresponding subsets of underlying records. Advantageously, it is much more efficient and straightforward and much less complex to use a value or value combination as a handle for dealing with a subset of records than to deal directly with the subset of records themselves.

Figure 4:
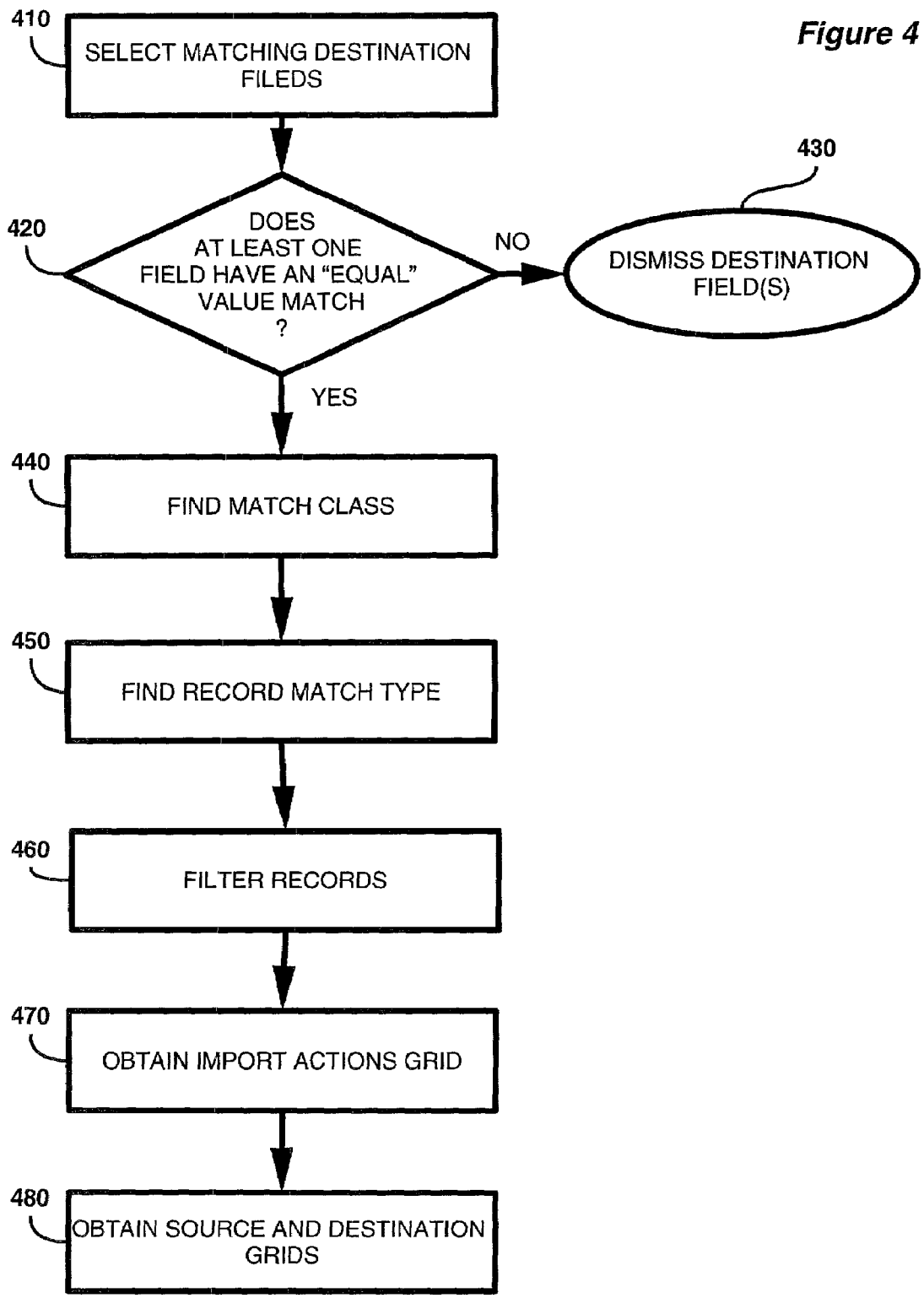
FIG. 4 is a flowchart illustrating steps for matching source and destination data fields and/or field values in an embodiment of the invention.

FIG. 4 is a flowchart illustrating steps for matching source and destination data fields and/or field values in an embodiment of the invention. At step 410, a system implementing an embodiment of the invention selects from the list of previously mapped destination fields the set of one or more "unique" matching fields or field combinations whose values are to be used to match each source record to one or more existing destination records. In step 410, the corresponding source and destination values of each field or field combination can be equal, undefined in the case of corresponding NULL and non-NULL values, or not equal. In particular, the different types of "value match" for a single matching field or field combination are as follows:

Equal. Every pair of corresponding source and destination values are be equal (or both values NULL).

Undefined. At least one pair of corresponding source and destination values contain a corresponding NULL and non-NULL value, and every other pair is Equal.

Not Equal. At least one pair of corresponding source and destination values are not equal.

At step 420 the system checks whether at least one field of field combination has Matching Destination Records. For an existing destination record to match a source record, the following is the case:

Based on a single matching field or field combination, the value match is Equal.

Based on multiple matching fields or field combinations, the value match of at least one of the matching fields or field combinations are Equal.

If there is not even a single Equal value match, then the destination record simply does not match the source record. If the test condition is not met, the system dismisses the destination field or field combination (e.g., at step 430).

At step 440, the system determines the match class. The "match class" for a particular source record indicates the number of matching destination records. The match classes are as follows:

None. The source record matches zero (0) destination records.

Single. The source record matches precisely one (1) destination record.

Multiple. The source record matches more than one (1+) destination record.

When there are multiple matching destination records, each matching field or field combination may have multiple value match types.

At step 450, the system determines a record match type. The value match for corresponding source and destination values is performed independently for each matching field or field combination to determine the "match type" between a source and destination record.

The individual match type for each of the destination records that match a particular source record is based on the combination of value match types of each of the matching fields or field combinations. The overall match type of the source record itself is based on the match type of each of the matching destination records. For each matching destination record, the match type is as follows:

Exact Match. All the value matches are Equal.

Partial Match. At least one value match is Equal and at least one value match is Undefined; no value matches can be Not Equal.

Conflict Match. At least one value match is Equal and at least one value match is Not Equal.

For a source record that matches a single destination record, the overall match type for the source record is the same as the match type for the single matching destination record. For a source record that matches multiple destination records, the overall match type of the source record is based on the "best" match type among each of the individual matching destination records, as follows:

Exact Match. At least one Exact Match among the matching destination records.

Partial Match. No Exact Matches but at least one Partial Match among the matching destination records.

Conflict Match. No Exact Matches or Partial Matches; all matching destination records are Conflict Matches.

Note that the only match type possible with a single matching field or field combination is Exact Match, since either a Partial Match or a Conflict Match require an Equal value match combined with another value match (Remember, if there isn't even a single Equal value match, then the destination record simply doesn't match the source record).

At step 460, the system filters the matched records. Each source record and each matching destination record can be marked as "active" or "inactive" in the Source and Destination Grid, respectively, based on the combination of value match types for each matching field or field combination. Records can be made active based on each of the three (3) value match types (Equal, Undefined, and Not Equal), as follows:

Equal matches active. Mark as active the records for which at least one value match is Equal.

Undefined matches active. Mark as active the records for which at least one value match is Undefined.

Not equal matches active. Mark as active the records for which all value matches are Not Equal. Note the special, more stringent requirement ("all", rather than "at least one") necessary to avoid making this case overbroad and causing all records to be active.

Each value match type can be individually set or cleared for each matching field or field combination, so that for n matching fields or field combinations, there are $3^n$ combinations of value match types for which one or more subgroups of records can be selectively marked as active or inactive.

In embodiments of the invention, each value match type for which records should be marked as active are ORed for a particular field or field combination, and then ANDed with the value match types for those records that should be made active for every other field or field combination. It should be noted that since each source record can match more than one destination record, each source record can belong to more than one subgroup of records defined by the combination of value match types for the matching fields or field combinations, each of which corresponds to a particular matching destination record. As a result, each of the $3^n$ combinations can identify an overlapping subgroup of source records.

At step 470, the systems partitions the transforms actions grid. Just as record filtering partitions the transform records into subgroups based on the combination of value matches, the Transform Actions grid partitions them based on the combination of match class and match type. For each combination of match class and match type there is a different set of possible transform actions, as listed in the Table 9 below:

TABLE 9

| Match Class | Match Type | Default Source Action (source record) | Default Destination Action (applied to each destination record) |
|---|---|---|---|
| None | None | Skip source record | N/A |
|  |  | Create new destination record | N/A |
| Single | Exact Match | Skip source record | None |
|  |  |  | Delete |
|  | Partial Match | Replace existing destination record | Replace |
|  |  | Update existing destination record (all mapped fields) | Update (all mapped fields) |
|  | Conflict Match | Update existing destination record (NULL fields only) | Update (NULL fields only) |
| Multiple | Exact Match | Skip source record | None |
|  |  |  | Delete |
|  | Partial Match | Replace existing destination records | None |
|  |  |  | Replace |

TABLE 9-continued

| Match Class | Match Type | Default Source Action (source record) | Default Destination Action (applied to each destination record) |
|---|---|---|---|
| | Conflict Match | Update existing destination records (all mapped fields) | None<br>Delete<br>Update (all mapped fields)<br>Update (NULL fields only) |
| | | Update existing destination records (NULL fields only) | None<br>Delete<br>Update (all mapped fields)<br>Update (NULL fields only) |

Note the following:

When a source record is to be transformed against multiple matching destination records, the system cannot determine from the default destination records action which of the multiple matching records should be singled out for special treatment if only some of them should be updated and others should be ignored or deleted.

Updates and replaces cannot be combined within a single group of matching destination records.

When the same destination record is a match for more than one source record, each source record may specify a different action for the destination record. In this case, the destination record may need to be cloned so that each of the source record actions can be properly and individually applied to the destination record such as shown in table-10:

TABLE 10

| Cloning Requirements for a Destination Record | | Destination Action for Second Source Record | | | |
|---|---|---|---|---|---|
| | | None | Delete | Replace | Update |
| Destination Action for First Source Record | None | OK | OK | OK | OK |
| | Delete | OK | Clone | Clone | Clone |
| | Replace | OK | Clone | Clone | Clone |
| | Update | OK | Clone | Clone | Clone |

Embodiments of the invention may use several dimensions simultaneously to break the group of transform records into different subgroups for processing a subgroup at a time. For example, embodiments of the invention use the following steps:

1. Subgroups of source records are marked as active or inactive based on the combination of value match types of the matching fields or field combinations.

2. The Transform Actions grid is then used to set the value for the Transform Action field of the Source Grid for the subgroup of source records that corresponds to that combination of match class and match type, applied only to the active records in to the group.

3. The Transform Action field can then be manually set on a record-by-record basis in the Source Grid to override these global Transform Action settings.

Note that unlike record filtering, each of the cases in the table above identifies a non-overlapping subgroup of source records. The entire set of cases taken together covers the entire group of source records.

At step 480, the system obtains a source and destination grids. A Source Grid contains all of the records of the source table. In addition to the source table fields, the Source Grid includes a column for Transform Action, columns for Match Class and Match Type (which together identify each source record as uniquely belonging to one of the cases in the Transform Actions grid), and additional columns, each of which contains a count indicating the number of destination records matching the particular conditions shown in Table 11:

TABLE 11

| Transform Action | Match Class | Match Type | Exact | Partial | Conflict | Eql [SKU] | Eql [Mfr; Part No] | Und [SKU] | Und [Mfr; Part No] | Neq [SKU] | Neq [Mfr; Part No] |
|---|---|---|---|---|---|---|---|---|---|---|---|
| Update | Single | Exact | a | b | c | d | e | f | g | h | i |
| Replace | Multiple | Conflict | j | k | l | m | n | o | p | q | r |
| Skip | Single | Partial | s | t | u | v | w | x | y | z | — |
| Create | None | None | a | b | c | m | l | n | q | r | s |

In embodiments of the invention, the Destination Grid contains the zero of more destination records that match the currently selected record in the Source Grid. In addition to the destination table fields, the Destination Grid includes a field specifying the appropriate action, as well as additional columns, each of which contains a bullet indicating whether the particular condition was met for that record:

TABLE 12

| Transform Action | Match Type | Exact | Partial | Conflict | Eql [SKU] | Eql [Mfr; Part No] | Und [SKU] | Und [Mfr; Part No] | Neq [SKU] | Neq [Mfr; Part No] |
|---|---|---|---|---|---|---|---|---|---|---|
| Update | Exact | • | | | • | • | | | | |
| Replace | Conflict | | | • | • | • | | | | • |
| Skip | Partial | | • | | • | | | • | | |

Note that the individual matching fields and field combinations of each matching destination record in the Destination Grid are color coded based on the value match of that field or field combination, which may be Equal, Undefined, or Not Equal.

In the examples below, the matching field(s) are specified as: (a) a single matching field (SKU), (b) a single matching field combination (Mfr. and PartNo.), (c) two matching fields (SKU and UPC), and (d) two matching fields, of which one is a combination field (SKU and the combination of Mfr. and PartNo.). The table below summarizes the different match types, combinations of matches and conflicts and also illustrates the color coding that is used to highlight, for each destination matching field, whether the value match type is Equal, Undefined, or Not Equal:

For a single matching field (SKU)::

TABLE 13

| Source SKU | Destination SKU | Match Type | Equal SKU | Undefined SKU | Not Equal SKU |
|---|---|---|---|---|---|
| 113–224 | 113–224 | Exact | • | | |
| | NULL | None | | • | |
| | 101–44 | None | | | • |
| NULL | 113–224 | None | | • | |
| | NULL | Exact | • | | |
| | 101–44 | None | | | • |

For a single matching field combination (Mfr. and PartNo.):

TABLE 14

| Source | | Destination | | Match Type | Equal | Undefined | Not Equal |
|---|---|---|---|---|---|---|---|
| Mfr. | Part No | Mfr | Part No | | Mfr, Part No | Mfr, Part No | Mfr, Part No |
| Baldor | 22345 | Baldor | 22345 | Exact | • | | |
| | | Baldor | NULL | None | | • | |
| | | Baldor | 4403 | None | | | • |
| | | NULL | 22345 | None | | • | |
| | | NULL | NULL | None | | • | |
| | | NULL | 4403 | None | | | • |
| | | SKF | 22345 | None | | | • |
| | | SKF | NULL | None | | | • |
| | | SKF | 4403 | None | | | • |
| NULL | 22345 | Baldor | 22345 | None | | • | |
| | | Baldor | NULL | None | | • | |
| | | Baldor | 4403 | None | | | • |
| | | NULL | 22345 | Exact | • | | |
| | | NULL | NULL | None | | • | |
| | | NULL | 4403 | None | | | • |
| | | SKF | 22345 | None | | • | |
| | | SKF | NULL | None | | • | |
| | | SKF | 4403 | None | | | • |

For two matching fields (SKU and UPC):

TABLE 15

| Source | | Destination | | Match | Equal | | Undefined | | Not Equal | |
|---|---|---|---|---|---|---|---|---|---|---|
| SKU | UPC | SKU | UPC | Type | SKU | UPC | SKU | UPC | SKU | UPC |
| 113–224 | 22345 | 113–224 | 22345 | Exact | • | • | | | | |
| | | 113-224 | NULL | Partial | • | | | • | | |
| | | 113–224 | 4403 | Conflict | • | | | | | • |
| | | NULL | 22345 | Partial | | • | • | | | |
| | | NULL | NULL | None | | | • | • | | |
| | | NULL | 4403 | None | | | • | | | • |
| | | 101–44 | 22345 | Conflict | | • | | | • | |
| | | 101–44 | NULL | None | | | | • | • | |
| | | 101–44 | 4403 | None | | | | | • | • |
| NULL | 22345 | 113–224 | 22345 | Partial | | • | • | | | |
| | | 113–224 | NULL | None | | | • | • | | |
| | | 113–224 | 4403 | None | | | • | | | • |
| | | NULL | 22345 | Exact | | • | • | | | |
| | | NULL | NULL | None | | | • | • | | |
| | | NULL | 4403 | None | | | • | | | • |
| | | 101–44 | 22345 | None | | • | | | • | |
| | | 101–44 | NULL | None | | | | • | • | |
| | | 101–44 | 4403 | None | | | | | • | • |

For two matching fields, one of which is a combination (SKU and the combination of Mfr. and PartNo.):

TABLE 16

| Source | | | Destination | | | Match | Equal | | Undefined | | Not Equal | |
|---|---|---|---|---|---|---|---|---|---|---|---|---|
| SKU | Mfr | Part No | SKU | Mfr | Part No | Type | SKU | Mfr, Part No | SKU | Mfr, Part No | SKU | Mfr, Part No |
| 113–224 | Baldor | 22345 | 113–224 | Baldor | 22345 | Exact | • | • | | | | |
| | | | 113-224 | Baldor | NULL | Partial | • | | | • | | |
| | | | 113–224 | Balder | 4403 | Conflict | • | | | | | • |
| | | | 113–224 | NULL | 22345 | Partial | • | | | • | | |
| | | | 113–224 | NULL | NULL | Partial | • | | | • | | |
| | | | 113–224 | NULL | 4403 | Conflict | • | | | | | • |
| | | | 113–224 | SKF | 22345 | Conflict | • | | | | | • |
| | | | 113–224 | SKF | NULL | Conflict | • | | | | | • |
| | | | 113–224 | SKF | 4403 | Conflict | • | | | | | • |
| | | | NULL | Baldor | 22345 | Partial | | • | • | | | |
| | | | NULL | Baldor | NULL | None | | | • | • | | |
| | | | NULL | Balder | 4403 | None | | | • | | | • |
| | | | NULL | NULL | 22345 | None | | | • | • | | |
| | | | NULL | NULL | NULL | None | | | • | • | | |
| | | | NULL | NULL | 4403 | None | | | • | | | • |
| | | | NULL | SKF | 22345 | None | | | • | | | • |
| | | | NULL | SKF | NULL | None | | | • | | | • |
| | | | NULL | SKF | 4403 | None | | | • | | | • |
| | | | 101–44 | Balder | 22345 | Conflict | | • | | | • | |
| | | | 101–44 | Balder | NULL | None | | | | • | • | |
| | | | 101–44 | Balder | 4403 | None | | | | | • | • |
| | | | 101–44 | NULL | 22345 | None | | | | • | • | |
| | | | 101–44 | NULL | NULL | None | | | | • | • | |
| | | | 101–44 | NULL | 4403 | None | | | | | • | • |
| | | | 101–44 | SKF | 22345 | None | | | | | • | • |
| | | | 101–44 | SKF | NULL | None | | | | | • | • |
| | | | 101–44 | SKF | 4403 | None | | | | | • | • |

The following examples illustrate the usage of field partitioning and mapping utilizing one or more partitioning schemes described above and utilized in one or more embodiments of the invention. One example uses a simple value mapping between different value domains, one-to-one mapping from values in a single source field to values in a single destination field. In this example, no source or destination partitioning is necessary because each source field value maps directly to a corresponding field value (see Table 17).

TABLE 17

| Source values: | Destination values: |
|---|---|
| State | State |
| Calif. | CA |
| Penna. | PA |
| Conn. | CT |

TABLE 17-continued

| Source values: State | Destination values: State |
|---|---|
| Tex. | TX |
| Mich. | MI |
| Tenn. | TN |
| Flor. | FL |

In the following table (Table 18), no source or destination partitioning is required, since the field values have a one-to-one relationship.

TABLE 18

| State | State |
|---|---|
| Calif. | CA |
| Penna. | PA |
| Conn. | CT |
| Tex. | TX |
| Mich. | MI |
| Tenn. | TN |
| Flor. | FL |

Additionally, the source values may include duplicates that correspond to the same destination value as shown in Table 19.

TABLE 19

Source values:☐ ☐Destination value:☐ ☐State☐ ☐State☐ ☐Calif.☐ ☐CA☐ ☐Ca.☐ ☐ ☐ ☐California☐ ☐ ☐ ☐Cal.☐ ☐ ☐ ☐
This example still does not require any partitioning since multiple values can be mapped to a single source value (see Table 20).

TABLE 20

State☐__☐State☐ ☐Calif.☐__☐CA☐ ☐Ca.☐__☐ ☐ ☐California☐__☐ ☐ ☐Cal.☐__☐ ☐ ☐
Finally, some of the source values may not have corresponding destination values, which can be added during the transform process.

Another example uses a Simple Value Mapping to Destination Hierarchy, one-to-one mapping from values in a single source field to a hierarchy in a single destination field (see Table 21). No source or destination partitioning is necessary because only leaf nodes are legal values for a hierarchy field and each source field value maps directly to a corresponding leaf node value in the destination hierarchy. The hierarchy is entirely transparent to the mapping.

TABLE 21

| Source values: Category | Destination hierarchy: Category |
|---|---|
| Laser Printers | Printers |
| Inkjet Printers | Laser |
| Dot Matrix Printers | Inkjet |
| Daisywheel Printers | Dot Matrix |
| Mounted Bearings | Daisywheel |
| Unmounted Bearings | Bearings |
| One-Phase Motors | Mounted |
| Two-Phase Motors | Unmounted |

TABLE 21-continued

| Source values: Category | Destination hierarchy: Category |
|---|---|
| Three-Phase Motors | Motors |
| | One-Phase |
| | Two-Phase |
| | Three-Phase |

In the following example (see Table 22), no source or destination partitioning is required:

TABLE 22

| Category | Category |
|---|---|
| | Printers |
| Laser Printers | Laser |
| Inkjet Printers | Inkjet |
| Dot Matrix Printers | Dot Matrix |
| Daisywheel Printers | Daisywheel |

TABLE 22-continued

| Category | Category |
|---|---|
| | Bearings |
| Mounted Bearings | Mounted |
| Unmounted Bearings | Unmounted |
| | Motors |
| One-Phase Motors | One-Phase |
| Two-Phase Motors | Two-Phase |
| Three-Phase Motors | Three-Phase |

The following example illustrates Recreating a Source Hierarchy. The example uses mapping from an implied hierarchy in two or more source fields to a hierarchy in a single destination field (see Table 23). Source partitioning (nested) is necessary to recreate a hierarchy in the source data from two or more fields so that each leaf node value in the source hierarchy can be mapped to a corresponding leaf node value in the destination hierarchy.

TABLE 23

| Source values: | | Destination hierarchy: |
| --- | --- | --- |
| Category | Subcategory | Category |
| Printer | LJ | Printers |
| Printer | IJ | Laser |
| Printer | DM | Inkjet |
| Printer | DW | Dot Matrix |
| Bearing | MNT | Daisywheel |
| Bearing | UNMNT | Bearings |
| Motor | 1-P | Mounted |
| Motor | 2-P | Unmounted |
| Motor | 3-P | Motors |
| | | One-Phase |
| | | Two-Phase |
| | | Three-Phase |

The following example illustrates: partition (nested) source field Category by source field Subcategory to recreate source hierarchy, with no destination partitioning (see Table 24).

TABLE 24

| Category Subcategory | Category |
| --- | --- |
| Printer | Printers |
| LJ | Laser |
| IJ | Inkjet |
| DM | Dot Matrix |
| DW | Daisywheel |
| Bearing | Bearings |
| MNT | Mounted |
| UNMNT | Unmounted |
| Motor | Motors |
| 1-P | One-Phase |
| 2-P | Two-Phase |
| 3-P | Three-Phase |

The following example illustrates merging source values with and without value mapping in accordance with an embodiment of the invention. Mapping from values that have been merged from the values in two or more source fields to values in a single destination field. Source partitioning (combined) is necessary to merge values from two or more fields so that each merged source value can be mapped to a corresponding destination field value (see Table 25).

TABLE 25

| Source values: | | Destination values: |
| --- | --- | --- |
| First Name | Last Name | Name |
| Paul | Newman | Paul Newman |
| Jeff | Fahey | Jeff Fahey |
| Randy | Spahn | Randy Spahn |
| Quincy | Jones | Quincy Jones |
| Jeff | Jones | Jeff Jones |
| Randy | Newman | Randy Newman |
| Paul | Smith | Paul Smith |

The following example illustrates: partition (combined) source field First Name by source field Last Name to merge source values, with no destination partitioning (see Table 26).

TABLE 26

| First Name; Last Name | Name |
| --- | --- |
| Paul Newman | Paul Newman |
| Jeff Fahey | Jeff Fahey |
| Randy Spahn | Randy Spahn |
| Quincy Jones | Quincy Jones |
| Jeff Jones | Jeff Jones |
| Randy Newman | Randy Newman |
| Paul Smith | Paul Smith |

Similarly, values from two or more source fields may need to be merged even if the mapped destination field does not require value mapping (see Table 27).

TABLE 27

| Source values: | | Destination values: |
| --- | --- | --- |
| Socket Size | Socket Unit | Socket Size [Length] |
| 3 | in | 1 in |
| 5 | in | 1.5 in |
| 20 | mm | 2 in |
| 15 | mm | 10 mm |
| 2 | in | |

The following example illustrates: partition (combined) source field Socket Size by source field Socket Unit to merge source values (see Table 28).

TABLE 28

| Socket Size; Socket Unit | Socket Size [Length] |
| --- | --- |
| 3 in | |
| 5 in | |
| 20 mm | |
| 15 mm | |
| 2 in | |

The following example illustrates a method for establishing one-to-one mappings from one-to-many using single source field combination, in accordance with an embodiment of the invention. Each source field value is combined with the corresponding values of a single additional field or set of fields to map each value combination to a destination value or value combination. The partition is applied at the field level and applies to the entire set of source field values (see Table 29).

TABLE 29

| Source values: | | Destination values: |
| --- | --- | --- |
| Category | Subcategory | Category |
| Printers | Laser | Laser Printers |
| Printers | Inkjet | Inkjet Printers |
| Printers | Dot Matrix | Dot Matrix Printers |
| Printers | Daisywheel | Daisywheel Printers |
| Bearings | Mounted | Mounted Bearings |
| Bearings | Unmounted | Unmounted Bearings |
| Motors | One-Phase | One-Phase Motors |
| Motors | Two-Phase | Two-Phase Motors |
| Motors | Three-Phase | Three-Phase Motors |

The following example illustrates: partition source field Category by source field Subcategory with no destination partitioning (see Table 30).

TABLE 30

| Subcategory | Category |
|---|---|
| Category | |
| Printers | |
| Laser | Laser Printers |
| Inkjet | Inkjet Printers |
| Dot Matrix | Dot Matrix Printers |
| Daisywheel | Daisywheel Printers |
| Bearings | |
| Mounted | Mounted Bearings |
| Unmounted | Unmounted Bearings |
| Motors | |
| One-Phase | One-Phase Motors |
| Two-Phase | Two-Phase Motors |
| Three-Phase | Three-Phase Motors |

The following example illustrates a method for establishing one-to-one mapping from one-to-many (e.g., using multiple source field combinations), in accordance with an embodiment of the invention. Each source field value is combined with the corresponding values of a different additional field, or set of fields, to map each value combination to a destination value or value combination. The partition is applied at the value level, and applies only to the individual source field value (see Table 31).

TABLE 31

Source values:

| Category | Printer Type | Bearing Type | Motor Type |
|---|---|---|---|
| Printers | Laser | | |
| Printers | Inkjet | | |
| Printers | Dot Matrix | | |
| Printers | Daisywheel | | |
| Bearings | | Mounted | |
| Bearings | | Unmounted | |
| Motors | | | One-Phase |
| Motors | | | Two-Phase |
| Motors | | | Three-Phase |

Destination hierarchy:

Category
  Printers
    Laser
    Inkjet
    Dot Matrix
    Daisywheel
  Bearings
    Mounted
    Unmounted
  Motors
    One-Phase
    Two-Phase
    Three-Phase The following example illustrates: partition source field Category, value Printers by source field Printer Type, value Bearings by source field Bearing Type, and value Motors by source field Motor Type, with no destination partitioning, since only leaf nodes are valid values for a hierarchy field.

TABLE 32

| Category | Category |
|---|---|
| Printers | Printers |
|   Printer Type | |
|     Laser | Laser |
|     Inkjet | Inkjet |
|     Dot Matrix | Dot Matrix |
|     Daisywheel | Daisywheel |
| Bearings | Bearings |
|   Bearing Type | |
|     Mounted | Mounted |
|     Unmounted | Unmounted |
| Motors | Motors |
|   Motor Type | |
|     One-Phase | One-Phase |
|     Two-Phase | Two-Phase |
|     Three-Phase | Three-Phase |

The following example illustrates a method for establishing one-to-one mapping from many-to-one relationships (e.g., using single destination field combination), in accordance with an embodiment of the invention. Each destination field value is combined with the corresponding values of a single additional field or set of fields to map each value combination to a source value or value combination. The partition is applied at the field level and applies to the entire set of destination field values (see Table 33).

TABLE 33

| Source values: | Destination values: | |
|---|---|---|
| Category | Category | Subcategory |
| Laser Printers | Printers | Laser |
| Inkjet Printers | Printers | Inkjet |
| Dot Matrix Printers | Printers | Dot Matrix |
| Daisywheel Printers | Printers | Daisywheel |
| Mounted Bearings | Bearings | Mounted |
| Unmounted Bearings | Bearings | Unmounted |
| One-Phase Motors | Motors | One-Phase |
| Two-Phase Motors | Motors | Two-Phase |
| Three-Phase Motors | Motors | Three-Phase |

The following example illustrates: no source partitioning, with a partition destination field Category by destination field Subcategory (see Table 34).

TABLE 34

| Category | Category |
|---|---|
| | Subcategory |
| | Printers |
| Laser Printers | Laser |
| Inkjet Printers | Inkjet |
| Dot Matrix Printers | Dot Matrix |
| Daisywheel Printers | Daisywheel |
| | Bearing |
| Mounted Bearings | Mounted |
| Unmounted Bearings | Unmounted |
| | Motor |
| One-Phase Motors | One-Phase |
| Two-Phase Motors | Two-Phase |
| Three-Phase Motors | Three-Phase |

The following example illustrates a method for establishing one-to-one mapping from many-to-one relationships using single destination field/attribute combination, in accordance with an embodiment of the invention. A single destination attribute field value is combined with the corresponding values of a single attribute or set of attributes to map each value combination to a source value or value combination. The partition is applied at the value level, and applies only to the individual destination field value (see Table 35).

TABLE 35

| Source values: | Destination values: | | |
|---|---|---|---|
| Category | Category | Printer Type | DPI |
| 300 DPI Laser Printers | Printers | Laser | 300 |
| 600 DPI Laser Printers | Printers | Laser | 600 |
| 1200 DPI Laser Printers | Printers | Laser | 1200 |
| 300 DPI Inkjet Printers | Printers | Inkjet | 300 |
| 600 DPI Inkjet Printers | Printers | Inkjet | 600 |
| 1200 DPI Inkjet Printers | Printers | Inkjet | 1200 |
| 300 Dot Matrix Printers | Printers | Dot Matrix | 300 |
| 600 Dot Matrix Printers | Printers | Dot Matrix | 600 |
| 1200 Dot Matrix Printers | Printers | Dot Matrix | 1200 |

The following example illustrates: no source partitioning, with partition destination field Category, value Printers by attributes Printer Type and DPI (see Table 36).

TABLE 36

| Category | Category |
|---|---|
|  | Printer Type |
|  | DPI |
|  | Printers |
|  | Laser |
| 300 DPI Laser Printers | 300 |
| 600 DPI Laser Printers | 600 |
| 1200 DPI Laser Printers | 1200 |
|  | Inkjet |
| 300 DPI Inkjet Printers | 300 |
| 600 DPI Inkjet Printers | 600 |
| 1200 DPI Inkjet Printers | 1200 |
|  | Dot Matrix |
| 300 Dot Matrix Printers | 300 |
| 600 Dot Matrix Printers | 600 |
| 1200 Dot Matrix Printers | 1200 |

The following example illustrates a method for establishing one-to-one mapping from many-to-one relationships using multiple destination field/attribute combinations, in accordance with an embodiment of the invention. Each destination attribute field value is combined with the corresponding values of a different attribute or set of attributes to map each value combination to a source value or value combination. The partition is applied at the value level, and applies only to the each of the individual destination field values (see Table 37).

TABLE 37

| Source values: | Destination values: | | | |
|---|---|---|---|---|
| Category | Category | Printer Type | Bearing Type | Motor Type |
| Laser Printers | Printers | Laser | | |
| Inkjet Printers | Printers | Inkjet | | |
| Dot Matrix Printers | Printers | Dot Matrix | | |
| Daisywheel Printers | Printers | Daisywheel | | |
| Mounted Bearings | Bearings | | Mounted | |
| Unmounted Bearings | Bearings | | Unmounted | |
| One-Phase Motors | Motors | | | One-Phase |

TABLE 37-continued

| Source values: | Destination values: | | | |
|---|---|---|---|---|
| Category | Category | Printer Type | Bearing Type | Motor Type |
| Two-Phase Motors | Motors | | | Two-Phase |
| Three-Phase Motors | Motors | | | Three-Phase |

The following example illustrates: no source partitioning, with partition destination field Category, value Printers by attribute Printer Type, value Bearings by attribute Bearing Type, and value Motors by attribute Motor Type (see Table 38).

TABLE 38

| Category | Category |
|---|---|
|  | Printer |
|  | Printer Type |
| Laser Printers | Laser |
| Inkjet Printers | Inkjet |
| Dot Matrix Printers | Dot Matrix |
| Daisywheel Printers | Daisywheel |
|  | Bearings |
|  | Bearing Type |
| Mounted Bearings | Mounted |
| Unmounted Bearings | Unmounted |
|  | Motors |
|  | Motor Type |
| One-Phase Motors | One-Phase |
| Two-Phase Motors | Two-Phase |
| Three-Phase Motors | Three-Phase |

Figure 5A:
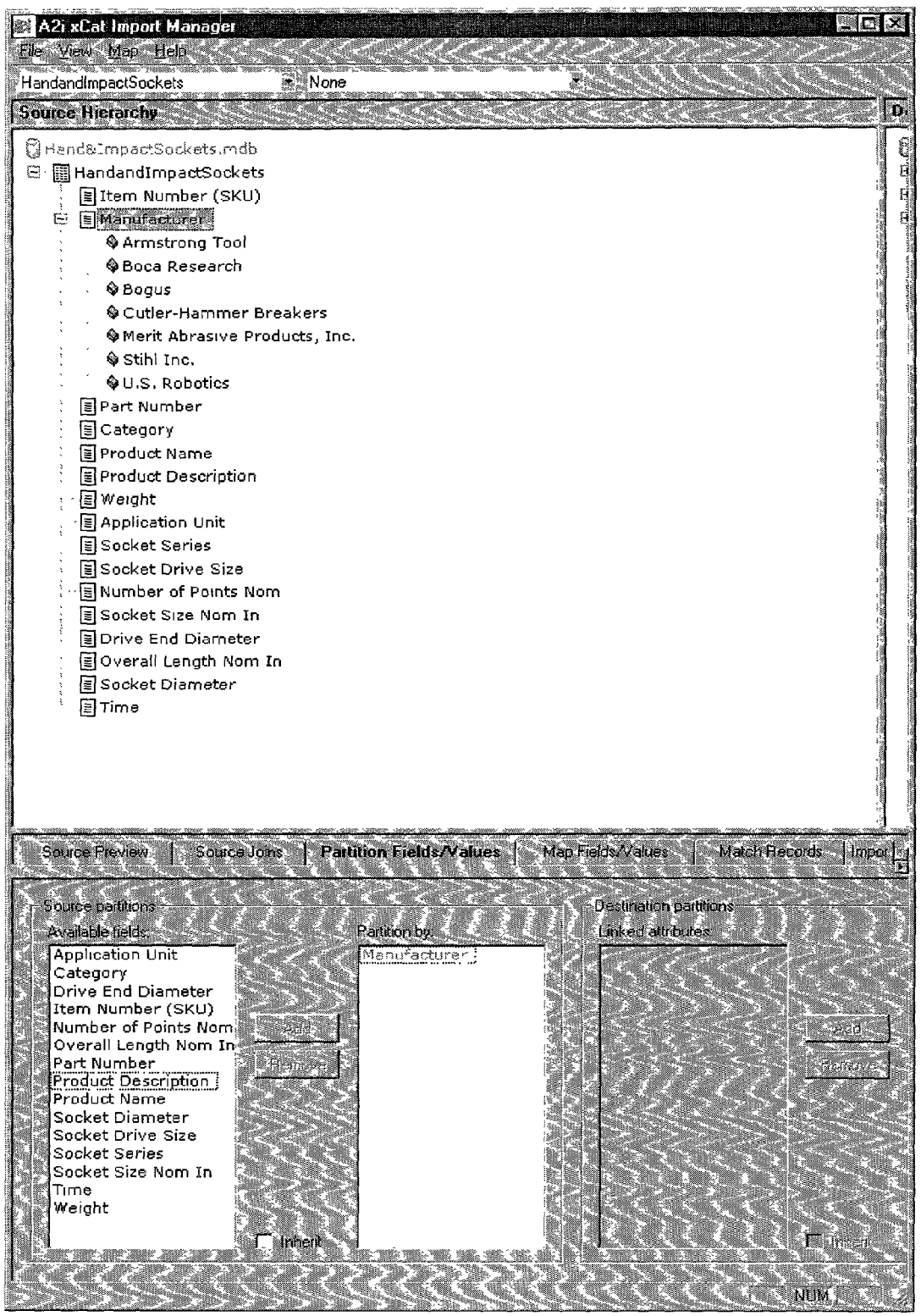
FIGS. 5a though 5g are examples of graphical user interfaces representing functionality to allow users to display and interact with the data, in one or more embodiments of the invention.
Figure 5C:
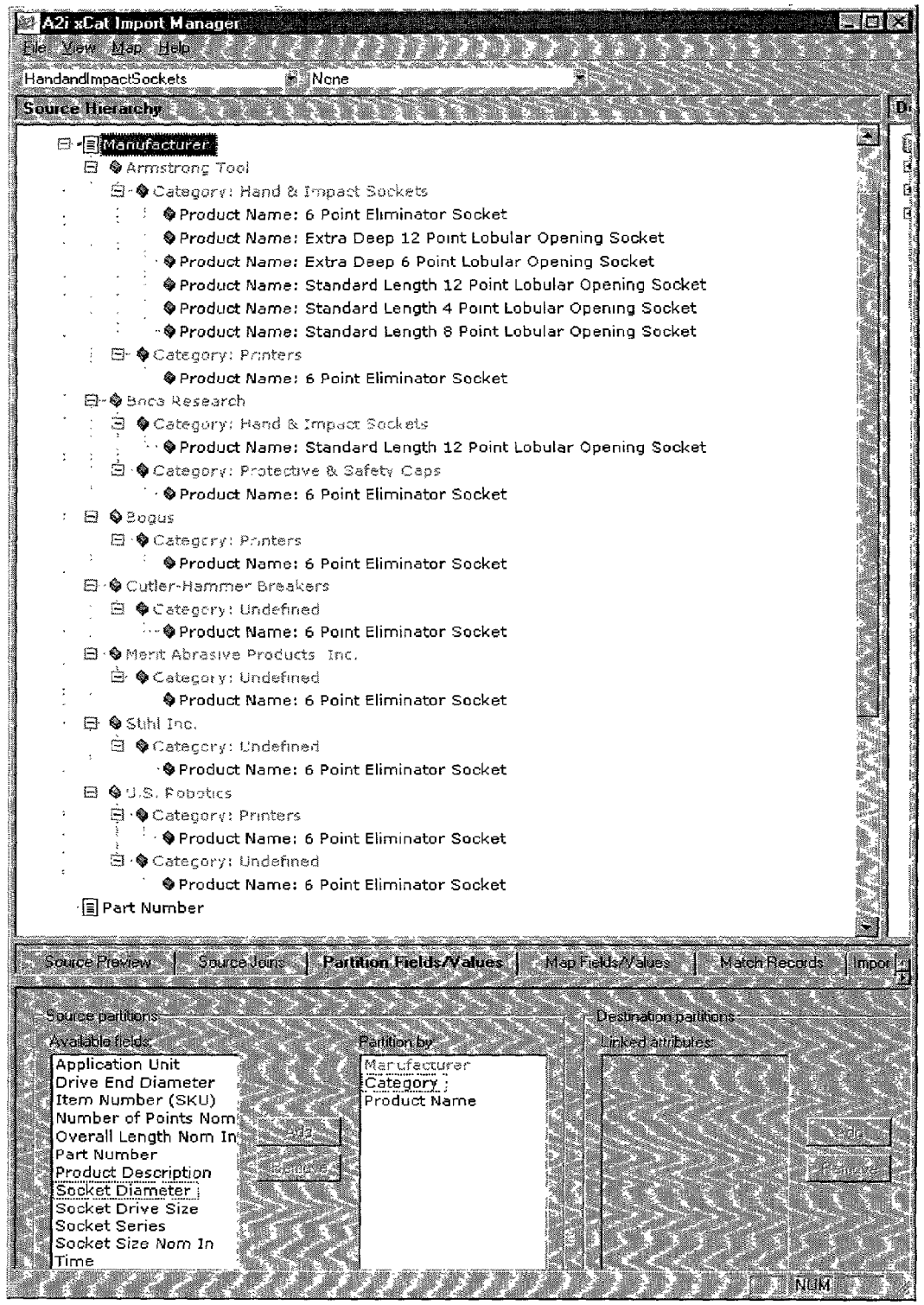
Figure 5D:
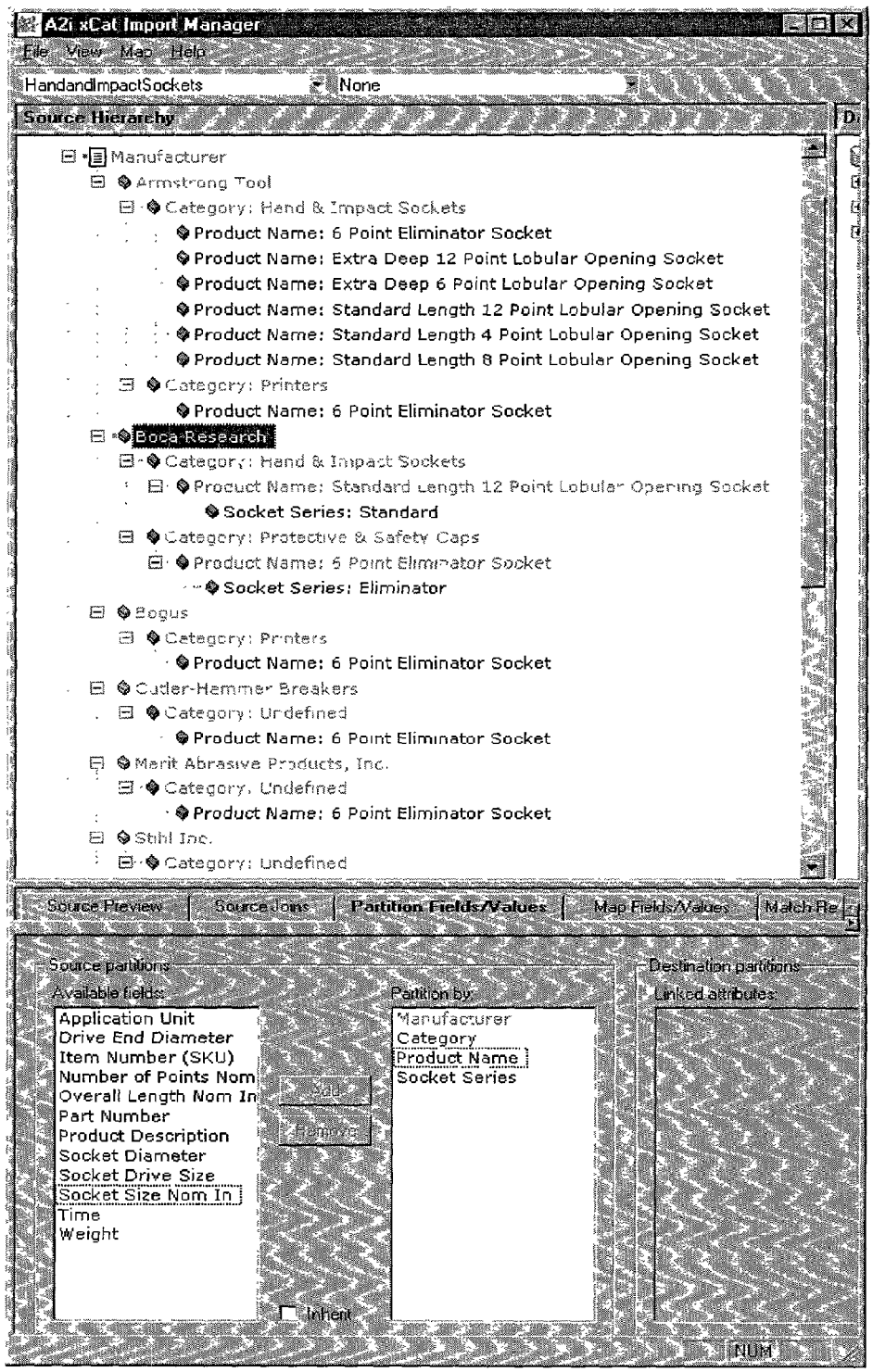
Figure 5E:
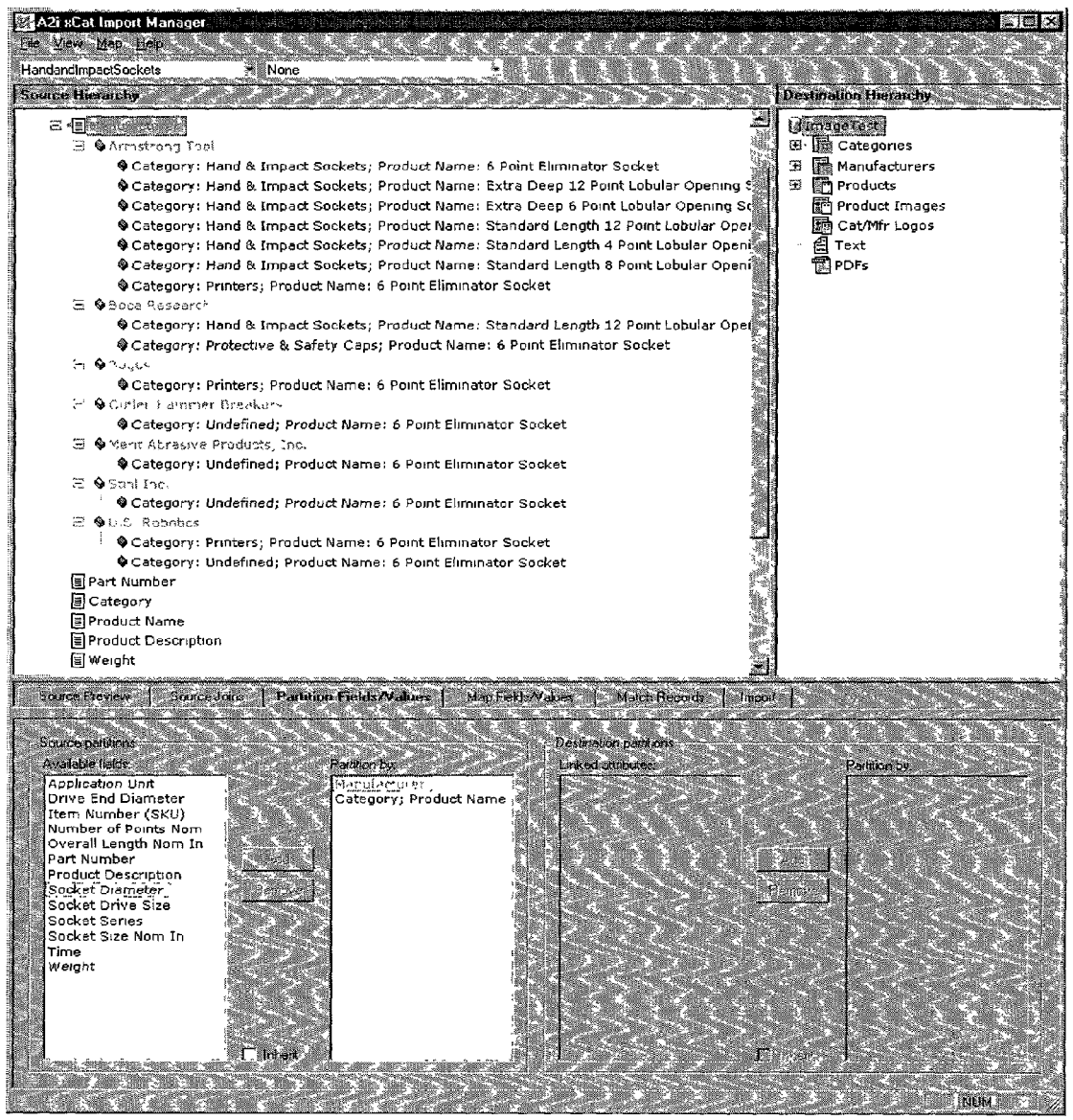
Figure 5F:
Figure 5G:
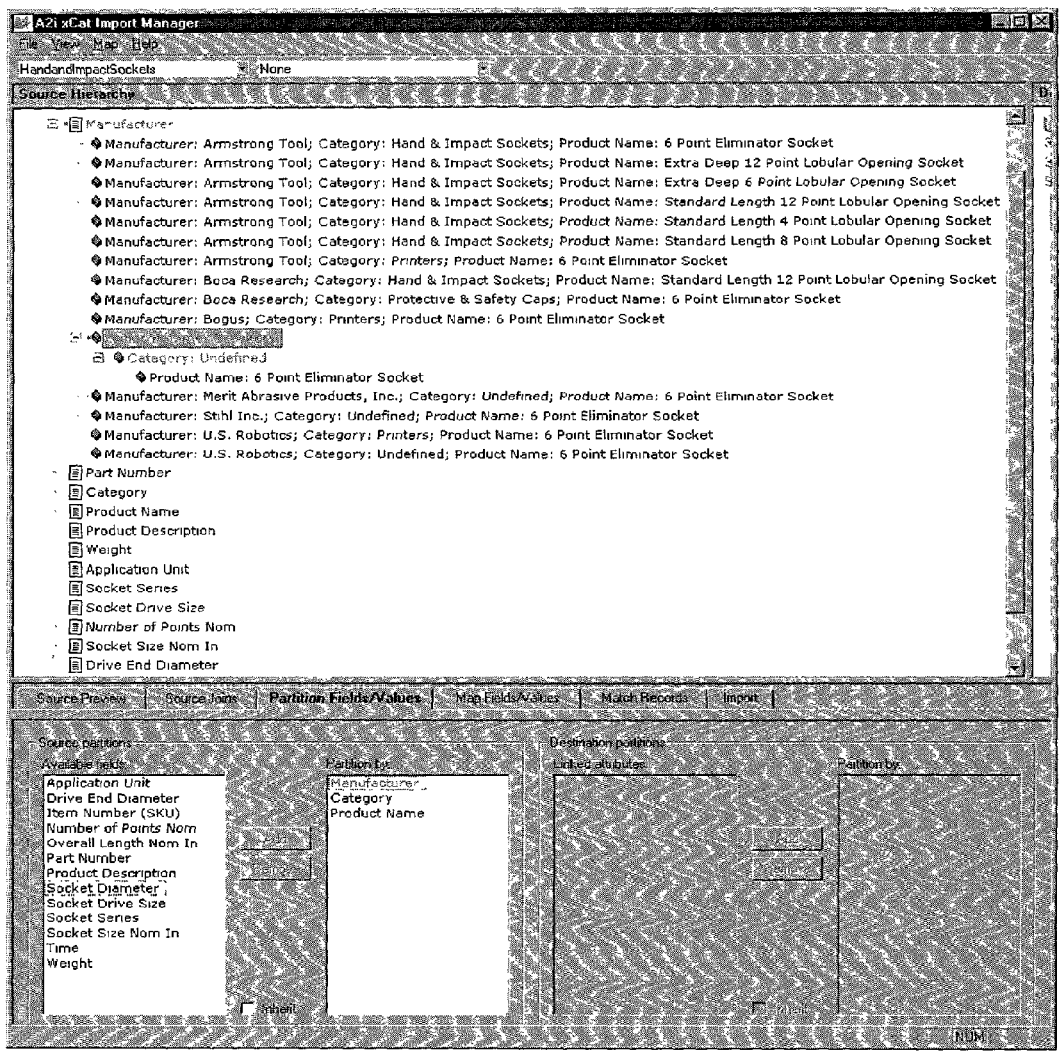

FIGS. 5a though 5g are examples of graphical user interfaces representing functionality to allow users to display and interact with the data, in one or more embodiments of the invention. The user interface components allow users to preview fields and field values, to preview combinations of fields and field values, to parse field data, to join data from two or more (source and/or destination) tables, to partition fields and field values, to convert field types, to create a mapping between fields and/or field values, to match records from one or more data sources, and to import data from one or more data sources into one or more data destinations.

Thus a method and apparatus for transforming data has been described. The invention however, is defined by the claims and the full scope of any equivalents.

APPENDIX A: Definitions

Column: a column of the table represents one field that is stored for each row in the table.

Database: a database is a logical collection of interrelated information, managed and stored as a unit.

Field: a field describes one of the data elements of a record and is common to all the records in a table.

Field mapping: field mapping is a mapping at the field level between a source field and a destination field (or attribute).

Full Partition: A full partition enumerates the entire Cartesian product of value combinations based on the two value domains regardless of whether or not each of the value combinations exists in actual records. By contrast, a partial partition removes from the set of value combinations created by the full partition those value combinations that do not exist in actual records. The partitions in this system are partial partitions.

Join: a join combines information from two tables by performing a lookup on every record of the primary table.

Lookup: a lookup uses one or more pairs of matching fields from two tables, taking the value of the field for a single record in the first primary table to "look up" additional information in a single corresponding record in the second lookup table.

Mapping: a mapping establishes a one-to-one correspondence between a single source item and a single destination item.

Partition: a partition creates a set of value combinations based on the value of one field and all of the corresponding values of a second field (or attribute). A single value for a field can be partitioned, resulting in a single set of value combinations, or an entire field can be partitioned, resulting in a set of value combinations for each value of the partitioned field. Partitions can be inherited from parent nodes in a hierarchy, and for a particular node in the hierarchy, can be nested (which creates hierarchy among value combinations) or combined (which merges value combinations). Note that the partitioning mechanism described here is based upon the partitioning capabilities described previously filed provisional patent application Ser. No. 60/234,015 (which is incorporated herein by reference), but extends and completely generalizes the capability to be infinitely flexible.

Record: a record is a representation of a real-world object such as a person, a product, or a company. A record consists of one or more individual data elements.

Row: Each horizontal row in the table represents a single record and consists of the same set of fields.

Table: table is a simple, rectangular, row/column arrangement of related data values.

Unique Field: a unique field (or field combination) is the key field (or compound key field combination) for a record and uniquely identifies the record. A table may have more than one unique field (or field combination).

Value domain: a value domain is the enumerated set of valid values for a destination text field (or attribute). Value domains exist primarily for lookup fields and text-valued attributes, but can also exist for a non-lookup field in a lookup table or when a non-lookup field has a well-defined set of valid values (such as the two-letter abbreviations for state). A field mapping to a destination with a value domain requires a value mapping.

Value mapping: value mapping is a mapping at the field value level between a particular source value and a particular destination value.

Value Match: A field mapping to a unique field requires a value match to detect existing records that match each source record.

What is claimed is:

1. A computer program product comprising:
a computer-usable medium having a computer program for transforming a source data structure to a destination data structure embodied therein, said computer program configured to:
obtain a source data structure comprising a set of source tables, a set of source fields, a set of source records, a set of source table relationships, and a set of source values;
join a plurality of source tables selected from said set of source tables;
parse a source field selected from said set of source fields and split said source field into a plurality of destination fields;
partition a plurality of source fields selected from said set of source fields into a combined destination field;
transform a source value into a destination value having a different data type or different unit of measure;
obtain transformation data comprising information associated with at least one set selected from said set of source tables, said set of source fields, said set of source records, said set of source table relationships and said set of source values and at least one destination data structure;
access a first source field of said source data structure and display all existing values for said first source field and obtain transformation data associated with all existing values to allow for field-at-a-time handling of said set of source fields to eliminate run-time exceptions;
transform said at least one set selected from said set of source tables, said set of source fields, said set of source records, said set of source table relationships and said set of source values into said at least one target destination.

2. The computer program product of claim 1 wherein said destination data structure comprises a database.

3. The computer program product of claim 2 wherein said database comprises catalog data.

4. The computer program product of claim 2 wherein said database comprises financial data.

5. The computer program product of claim 1 wherein said transformation data comprises mapping information and said computer program is configured to use said mapping information to execute a means for mapping said source data structure to said destination data structure.

6. The computer program product of claim 5 wherein said mapping information is displayed to a user.

7. The computer program product of claim 5 wherein said mapping information comprises field-level mapping information that identifies a correlation between at least one of said set of source fields and at least one destination field.

8. The computer program product of claim 5 wherein said field-level mapping information is displayed to a user.

9. The computer program product of claim 7 wherein said at least one of said set of source fields in said field-level mapping comprises a source field combination having a plurality of source fields.

10. The computer program product of claim 9 wherein said source field combinations are displayed to a user.

11. The computer program product of claim 7 wherein said at least one destination field in said field-level mapping information comprises a destination field combination having a plurality of destination fields.

12. The computer program product of claim 11 wherein said destination field combinations are displayed to a user.

13. The computer program product of claim 7 wherein said at least one of said set of source fields in said field-level mapping information comprises a source field combination having a plurality of source fields and said at least one destination field in said field-level mapping comprises a destination field combination having a plurality of destination fields.

14. The computer program product of claim 13 wherein said source field combinations and said destination field combinations are displayed to a user.

15. The computer program product of claim 7 wherein said mapping information comprises value-level mapping information that identifies a correlation between at least one of said set of source values of said at least one of said set of source fields and at least one of said set of destination values of said at least one destination field.

16. The computer program product of claim 15 wherein said value-level mapping information is displayed to a user.

17. The computer program product of claim 15 wherein said at least one of said set of source values in said value-level mapping comprises a source value combination having said set of source values of a plurality of said at least one of said set of source fields associated with a set of destination values of said at least one of said destination fields.

18. The computer program product of claim 17 wherein said source value combinations are displayed to a user.

19. The computer program product of claim 15 wherein said value-level mapping comprises a destination value combination having a plurality of said set of destination values of said at least one of said destination fields associated with a plurality of said set of source values of said at least one of said set of source fields.

20. The computer program product of claim 19 wherein said destination value combinations are displayed to a user.

21. The computer program product of claim 15 wherein said set of source values of said at least one of said set of source fields in said value-level mapping comprises a source value combination having values of a plurality of said at least one of said set of source fields and said destination values of said at least one of said destination fields in said value-level mapping comprises a destination value combination having a plurality of said at least one of said destination fields.

22. The computer program product of claim 21 wherein said source value combinations and said destination value combinations are displayed to a user.

23. The computer program product of claim 1 wherein said transformation data comprises type information and said computer program comprises a means for converting said set of source fields from a source type to a destination type based on said type information.

24. The computer program product of claim 23 wherein said type information is displayed to a user.

25. The computer program product of claim 1 wherein said transformation data comprises type information for converting said set of source fields from a source type to a destination type based on said type information.

26. The computer program product of claim 1 wherein said computer program is configured to merge said set of source values of said set of source fields into source value combinations comprising a plurality of source values and convert said source value combinations into destination fields of said destination data structure.

27. The computer program product of claim 26 wherein said source value combinations are displayed to a user.

28. The computer program product of claim 1 wherein said computer program is configured to generate hierarchy among said set of source values of said set of source fields into source value hierarchies comprising a plurality of source values and convert said source value hierarchies into destination fields of said destination data structure.

29. The computer program product of claim 28 wherein said source value hierarchies are displayed to a user.

30. The computer program product of claim 1 wherein said transformation data is generated automatically.

31. The computer program product of claim 1 wherein said transformation data comprises parsing information and said computer program is configured to execute a means for parsing data values from descriptive fields.

32. The computer program product of claim 1 wherein said source data structure comprises descriptive fields having data values and said computer program is configured to use said transformation data to extract said data values from said descriptive fields.

33. The computer program product of claim 1 wherein said computer program is configured to generate at least one added source field in accordance with said transformation data.

34. The computer program product of claim 33 wherein said added source field is displayed to a user.

35. The computer program product of claim 1 wherein said computer program is configured to generate at least one cloned source field containing a copy of said set of source values in one of said set of source fields in accordance with said transformation data.

36. The computer program product of claim 35 wherein said at least one cloned source field is displayed to a user.

37. The computer program product of claim 35 wherein said values of said at least one cloned source field is displayed to a user.

38. The computer program product of claim 1 wherein said computer program is configured to generate at least one split-into-hierarchy source field containing a hierarchy based on said set of source values in one of said set of source fields in accordance with said transformation data.

39. The computer program product of claim 38 wherein said at least one split-into-hierarchy source field is displayed to a user.

40. The computer program product of claim 38 wherein said set of source values of said split-into-hierarchy source field are displayed to a user.

41. The computer program product of claim 1 wherein said computer program is configured to generate at least one plurality of split-into-multiple source fields each containing components of said set of source values in one of said set of source fields in accordance with said transformation data.

42. The computer program product of claim 41 wherein said plurality of split-into-multiple source fields are displayed to a user.

43. The computer program product of claim 41 wherein said set of source values of said plurality of split-into-multiple source fields are displayed to a user.

44. The computer program product of claim 1 wherein said computer program is configured to extract data values from descriptive fields by identifying said data values within said descriptive fields, parsing said data values from said descriptive fields, and populating said at least one new source field wit said data values.

45. The computer program product of claim 1 wherein said transformation data comprises measurement information and said computer program uses said measurement information to execute a means for normalizing units of measure within said set of source fields.

46. The computer program product of claim 45 wherein said measurement information is displayed to a user.

47. The computer program product of claim 45 wherein said means for normalizing further comprises combining numeric value and said unit of measure from a plurality of source fields.

48. The computer program product of claim 1 wherein at least one of said set of source values within said set of source fields comprises an improperly formed measurement value comprising a numeric value and a unit of measure.

49. The computer program product of claim 48 wherein said unit of measure comprises an implicit unit of measure associated with said set of source values.

50. The computer program product of claim 48 wherein said unit of measure comprises inconsistent string values.

51. The computer program product of claim 48 wherein said units of measure differ within a plurality of said values within each of said set of source fields.

52. The computer program product of claim 48 wherein computer program is further configured to append said unit of measure to set of source values missing said unit of measure.

53. The computer program product of claim 1 wherein said source data structure comprises a plurality of joined data sources.

54. The computer program product of claim 1 wherein said transformation data comprises matching information and said computer program is configured to use said matching information to execute a means for matching said set of source records to said destination records.

55. The computer program product of claim 54 wherein said matching information comprises record-level information identifying said correlation between at least one of said set of source records and at least one of said destination records.

56. The computer program product of claim 54 wherein said matching information is displayed to a user.

57. The computer program product of claim 54 wherein said matching information indicates a new destination record is to be created with at least one of said set of source values from one of said set of source fields from one of said set of source records.

58. The computer program product of claim 54 wherein said matching information indicates at least one of said destination fields in at least one of said destination records is to be updated with at least one of said set of source values from one of said set of source fields.

59. The computer program product of claim 54 wherein said matching information indicates at least one destination record is to be replaced with at least one of said set of source records.

60. The computer program product of claim 1 wherein said computer program is further configured to transform said set of source values in accordance with said transformation data.

61. The computer program product of claim 60 wherein said transformed set of source values are displayed to a user.

62. The computer program product of claim 1 wherein said computer program comprises an integrated interface for obtaining said transformation data.

63. The computer program product of claim 62 wherein said source data structure is represented within said integrated interface as a hierarchy.

64. The computer program product of claim 63 wherein said hierarchy comprises a visual representation of said set of source tables.

65. The computer program product of claim 63 wherein said hierarchy comprises a visual representation of said set of source fields.

66. The computer program product of claim 63 wherein said hierarchy comprises a visual representation of said source table relationships.

67. The computer program product of claim 66 wherein a user can define additional relationships between said set of source tables.

68. The computer program product of claim 63 wherein said hierarchy comprises a visual representation of said source data values.

69. The computer program product of claim 62 wherein said destination data structure is represented within said integrated interface as a hierarchy.

70. The computer program product of claim 69 wherein said hierarchy comprises a visual representation of said destination tables.

71. The computer program product of claim 69 wherein said hierarchy comprises a visual representation of said destination fields.

72. The computer program product of claim 69 wherein said hierarchy comprises a visual representation of said destination table relationships.

73. The computer program product of claim 69 wherein said hierarchy comprises a visual representation of said destination data values.

74. The computer program product of claim 1 wherein said computer program comprises a means for handling exceptions a source field at a time.

75. The computer program product of claim 1 wherein said computer program is configured to collapse said set of source values within said set of source records down to a set of distinct values within said set of source records.

76. The computer program product of claim 75 wherein said set of distinct values is configured to act as a proxy for said set of source values.

77. The computer program product of claim 75 wherein each distinct value within said set of distinct values is configured to act as a proxy for all instances of said distinct value across said set of source records.

78. The computer program product of claim 75 wherein said transformation data is applied to said set of distinct values.

79. The computer program product of claim 75 wherein said transformation data is applied once to each distinct value rather than once for each instance of said distinct value, and is automatically propagated to each instance of said distinct value.

* * * * *